United States Patent
Ikematsu et al.

(10) Patent No.: US 9,114,318 B2
(45) Date of Patent: Aug. 25, 2015

(54) STORAGE MEDIUM STORING GAME PROGRAM, AND GAME APPARATUS

(75) Inventors: Shinichi Ikematsu, Kyoto (JP); Makoto Miyanaga, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1555 days.

(21) Appl. No.: 11/905,906

(22) Filed: Oct. 5, 2007

(65) Prior Publication Data
US 2009/0011808 A1    Jan. 8, 2009

(30) Foreign Application Priority Data

Jul. 6, 2007  (JP) ................................. 2007-178714

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63B 67/00* | (2006.01) |
| *A63F 9/02* | (2006.01) |
| *A63F 13/20* | (2014.01) |

(52) U.S. Cl.
CPC ........... *A63F 13/06* (2013.01); *A63F 2300/646* (2013.01); *A63F 2300/8076* (2013.01)

(58) Field of Classification Search
CPC . A63F 13/00; A63F 13/06; A63F 2300/8076; A63F 2300/646; A63F 9/02; A63F 9/021
USPC ........................................... 463/51, 2, 23, 53
See application file for complete search history.

(56) References Cited

U.S. PATENT DOCUMENTS

| | | | | |
|---|---|---|---|---|
| 4,695,058 | A | * | 9/1987 | Carter et al. ....................... 463/5 |
| 5,993,319 | A | * | 11/1999 | Aoyama .......................... 463/43 |
| 6,328,650 | B1 | * | 12/2001 | Fukawa et al. .................. 463/36 |
| 2004/0266528 | A1 | * | 12/2004 | Wang ............................... 463/37 |
| 2007/0082729 | A1 | * | 4/2007 | Letovsky ........................ 463/23 |
| 2007/0202946 | A1 | * | 8/2007 | Matsuyama .................... 463/30 |
| 2007/0218965 | A1 | * | 9/2007 | Tilston et al. ..................... 463/2 |
| 2008/0106517 | A1 | * | 5/2008 | Kerr et al. ...................... 345/158 |
| 2008/0138777 | A1 | * | 6/2008 | Rapoza et al. ................ 434/238 |

FOREIGN PATENT DOCUMENTS

| | | | |
|---|---|---|---|
| JP | 8-117447 | 5/1996 | |
| JP | 08117447 | * 5/1996 | ................ A63F 9/22 |

OTHER PUBLICATIONS

Achilles Heel's review of Virtua Cop 2 entitled "An excellent improvement uppon Virtua Cop" posted at http://www.gamefaqs.com/saturn/199198-virta-cop-2/reviews dated Jun. 2, 2001.*

* cited by examiner

*Primary Examiner* — Kang Hu
*Assistant Examiner* — Syvila Weatherford
(74) *Attorney, Agent, or Firm* — Nixon & Vanderhye P.C.

(57) ABSTRACT

An input of an aiming point coordinate indicating a position of an aiming point is accepted from an input device, and it is determined whether or not the aiming point overlaps with an object based on the aiming point coordinate. When it is determined that the aiming point overlaps with the object, a target time for which the object overlapped by the aiming point becomes a target of shooting is set such that the target time is correlated with the object. Further, a shooting operation is accepted, and when the shooting operation is accepted within the target time after the target time is set for the object, shooting at the object for which the target time has been set is performed irrespective of the position of the aiming point, and the target time is reset for the object.

23 Claims, 19 Drawing Sheets

| WEAPON ID (1261) | OFFENSIVE POWER (1262) | MAXIMUM FLYING DISTANCE (1263) |
|---|---|---|
| 001 | 10 | 2000 |
| 002 | 20 | 1500 |
| 003 | 100 | 500 |
| ⋮ | ⋮ | ⋮ |

| OBJECT ID (1271) | HP (1272) |
|---|---|
| 001 | 50 |
| 002 | 10 |
| 003 | 150 |
| ⋮ | ⋮ |

| OBJECT ID (1281) | POSITION COORDINATE (1282) | REMAINING HP (1283) |
|---|---|---|
| 001 | (315, 0, 0) | 40 |
| 002 | (503, 712, 15) | 30 |
| 003 | (215, 321, 0) | 10 |
| ⋮ | ⋮ | ⋮ |

| OBJECT ID (1291) | WEAPON ID (1292) | CORRECTION VALID TIME (1293) | BLOCKING TIME (1294) |
|---|---|---|---|
| 001 | 002 | 105 | 0 |

STORAGE MEDIUM STORING GAME PROGRAM, AND GAME APPARATUS

CROSS REFERENCE TO RELATED APPLICATION

The disclosure of Japanese Patent Application No. 2007-178714, filed on Jul. 6, 2007, is incorporated herein by reference.

BACKGROUND

1. Field of the Technology

The present technology relates to a storage medium storing a game program executed by the computer of a game apparatus which performs shooting at an object existing in a virtual space based on an input from an input device, and a game apparatus. More particularly, the present invention relates to correction of an aiming point for taking aim at an object to be shot.

2. Description of the Background Art

In a game apparatus in which a target displayed on a display device is shot with an imitation gun (a gun-shaped controller, or the like), when a player holds the imitation gun toward a game screen, there may occur the difference between a position which is recognized as the position of the aiming point of the imitation gun by the game apparatus and a position which the player intends to take aim at, and there is a problem that the difference cannot be corrected. Thus, a game apparatus is disclosed which performs game processing with the difference corrected (e.g. Japanese Laid-Open Patent Publication No. 8-117447). In the game apparatus, the difference is recognized using a setting screen, and a correction formula is set for correcting the difference. In the actual processing within a game, arithmetic is performed using the correction formula. Thus, processing is performed so as not to generate sensory difference between the position of the aiming point which is actually detected by the game apparatus and the position which the player intends to take aim at.

However, the game apparatus disclosed by Japanese Laid-Open Patent Publication No. 8-117447 has a problem as follows. Even though the game processing is performed using the correction formula as described above, since the player plays the game while holding the imitation gun, fatigue is accumulated in his or her arm as the game proceeds. Thus, the gunpoint is lowered unconsciously due to the weight of the imitation gun, or his or her hand shakes, with the result that there occurs the difference between the position which is recognized as the position of the aiming point of the imitation gun by the game apparatus (the position after the above correction formula is used) and the position which the player actually intends to take aim at. In other words, there occurs the difference which cannot be corrected by the above correction formula as the game proceeds. Thus, the player can shoot targets as intended immediately after the start of the game, but as the game proceeds the player may not shoot the targets as intended. Especially when shooting at the same target many times, the player intends to shoot at the same position, but the player unconsciously moves the aiming point from the intended position and bullets do not hit the target. Thus, the player has an impression that the bullets do not hit the target even though the player accurately takes aim at a target, and hence the player is frustrated. As a result, there arises a problem that the player's interest in the game wanes. When shooting a small and distant target in a three-dimensional virtual game space, it is necessary to accurately take aim at the target. However, it is hard for the player to shoot such a target, so that the player is frustrated and there also arises a problem that the player's interest in the game wanes.

SUMMARY

Therefore, a feature of an example embodiment presented herein is to provide a storage medium storing a game program and a game apparatus which allow a player to shoot a target without feeling the difference between a position at which the player intends to take aim and a position of an aiming point which is recognized by the game apparatus.

The present embodiment has the following features to achieve the above. It is noted that reference numerals and supplementary explanations in parentheses are merely provided to facilitate the understanding of the present embodiment in relation to the later-described embodiment, rather than limiting the scope of the present embodiment in any way.

A first aspect of the present embodiment is a storage medium storing a game program executed by a computer of a game apparatus which displays on a game screen a scene of shooting at an object existing in a virtual space based on an input from an input device, the game program causing the computer to operate as: aiming point coordinate acceptance means (S5), aiming point determination means (S41), target setting means (S44), shooting operation acceptance means (S2), shooting processing means (S63, S65), and target resetting means (S64). The aiming point coordinate acceptance means is means for accepting from the input device an input of an aiming point coordinate indicating a position of an aiming point in the game screen. The aiming point determination means is means for determining whether or not the aiming point overlaps with the object based on the aiming point coordinate accepted by the aiming point coordinate acceptance means. The target setting means is means for setting a target time for which the object overlapped by the aiming point becomes a target of shooting such that the target time is correlated with the object when the aiming point determination means determines that the aiming point overlaps with the object. The shooting operation acceptance means is means for accepting a shooting operation with respect to the virtual space from the input device. The shooting processing means is means for performing shooting at the object for which the target time is set in the virtual space irrespective of the position of the aiming point when the shooting operation acceptance means accepts shooting operation within the target time after the target setting means sets the target time for the object. The target resetting means is means for resetting the target time for the object which has become the target of shooting when the shooting operation acceptance means accepts the shooting operation within the target time.

According to the first aspect, a player is prevented from feeling the distance between a position which the player intends to take aim at and an actual position of the aiming point in a shooting game.

In a second aspect of the present embodiment based on the first aspect, the shooting processing means performs the shooting based on the position of the aiming point when the shooting operation is accepted after elapse of the target time.

According to the second aspect, since shooting at an actual position of aim is performed after elapse of the target time, the fun of the game is enhanced.

In a third aspect of the present embodiment based on the second aspect, the game program further causes the computer to operate as: blocking time measuring means for measuring a blocking time for which a shield exists between the object for which the target time is set and the aiming point coordinate in the virtual space; and target cancellation means for deleting the setting of the target time when the blocking time exceeds a predetermined time.

According to the third aspect, the reality of the game is enhanced, and hence the fun of the game is enhanced.

In a fourth aspect of the present embodiment based on the second aspect, the target setting means changes the target time according to a content of game processing executed by the game program.

According to the fourth aspect, the game is prevented from being monotonized, and the fun of the game is enhanced.

In a fifth aspect of the present embodiment based on the third aspect, the game program further causes the computer to operate as shooting tool data storage means (126) and shooting tool selection means (S2, S3, S4). The shooting tool data storage means is means for storing in a predetermined storage section a plurality of shooting tool data which are data concerning shooting tools used for shooting in the virtual space and in which the target time are set at a different value for each shooting tool. The shooting tool selection means is means for selecting the shooting tool to be used in the shooting operation. Further, the target setting means sets the target time with reference to the shooting tool data corresponding to the shooting tool selected by the shooting tool selection means.

According to the fifth aspect, a shooting tool is provided with a feature, and the fun of the game is enhanced.

In a sixth aspect of the present embodiment based on the fourth aspect, the game program further causes the computer to operate as difficulty level setting means for setting a difficulty level of a game. Also, the target setting means sets a different time as the target time for each difficulty level based on the difficulty level of the game set by the difficulty level setting means.

According to the sixth aspect, the player enjoys playing the game to the level of his or her skill.

In a seventh aspect of the present embodiment based on the sixth aspect, the target setting means sets the target time longer as the difficulty level of the game is set lower by the difficulty level setting means.

According to the seventh aspect, the same advantageous effect as the sixth aspect is obtained.

In an eighth aspect of the present embodiment based on the fourth aspect, the game program further causes the computer to operate as size data storage means for storing in a predetermined storage section size data indicating a size of the object in the virtual space. Also, the target setting means sets the target time based on the size data of the object overlapped by the aiming point.

According to the eighth aspect, ease of aiming is changed depending on the size of an object which becomes a target of shooting, and hence the fun of the game is enhanced.

In a ninth aspect of the present embodiment based on the eighth aspect, the target setting means sets the target time longer as the size of the object overlapped by the aiming point is smaller.

According to the ninth aspect, a small object at which it is hard to aim is hit easily, and hence the player feels less frustrated and is prevented from losing an interest in the game.

In a tenth aspect of the present embodiment based on the fourth aspect, the game program further causes the computer to operate as scene data storage means for storing in a predetermined storage means a plurality of scene data concerning scenes in which shooting is performed in the virtual space. Further, the target setting means sets a different time as the target time depending on the scene data.

According to the tenth aspect, each scene in the game is provided with a feature, and hence the game is prevented from being monotonized.

In an eleventh aspect of the present embodiment based on the fourth aspect, the game program further causes the computer to operate as: blocking time measuring means for measuring a blocking time for which a shield exists between the object for which the target time is set and the aiming point coordinate in the virtual space; and target cancellation means for deleting the setting of the target time when the blocking time exceeds a predetermined time.

According to the eleventh aspect, the reality of the game is enhanced, and hence the fun of the game is enhanced.

In a twelfth aspect of the present embodiment based on the first aspect, the target setting means changes the target time according to a content of game processing executed by the game program.

According to the twelfth aspect, the game is prevented from being monotonized, and the fun of the game is enhanced.

In a thirtieth aspect of the present embodiment based on the twelfth aspect, the game program further causes the computer to operate as shooting tool data storage means (126) and shooting tool selection means (S2, S3, S4). The shooting tool data storage means is means for storing in a predetermined storage section a plurality of shooting tool data which are data concerning shooting tools used for shooting in the virtual space and in which the target time are set at a different value for each shooting tool. The shooting tool selection means is means for selecting the shooting tool to be used in the shooting operation. Further, the target setting means sets the target time with reference to the shooting tool data corresponding to the shooting tool selected by the shooting tool selection means.

According to the thirtieth aspect, a shooting tool is provided with a feature, and the fun of the game is enhanced.

In a fourteenth aspect of the present embodiment based on the twelfth aspect, the game program further causes the computer to operate as difficulty level setting means for setting a difficulty level of a game. Also, the target setting means sets a different time as the target time for each difficulty level based on the difficulty level of the game set by the difficulty level setting means.

According to the fourteenth aspect, the player enjoys playing the game to the level of his or her skill.

In a fifteenth aspect of the present embodiment based on the fourteenth aspect, the target setting means sets the target time longer as the difficulty level of the game is set lower by the difficulty level setting means.

According to the fifteenth aspect, the same advantageous effect as the fourteenth aspect is obtained.

In a sixteenth aspect of the present embodiment based on the twelfth aspect, the game program further causes the computer to operate as size data storage means for storing in a predetermined storage section size data indicating a size of the object in the virtual space. Also, the target setting means sets the target time based on the size data of the object overlapped by the aiming point.

According to the sixteenth aspect, ease of aiming is changed depending on the size of an object which becomes a target of shooting, and hence the fun of the game is enhanced.

In a seventeenth aspect of the present embodiment based on the sixteenth aspect, the target setting means sets the target time longer as the size of the object overlapped by the aiming point is smaller.

According to the seventeenth aspect, a small object at which it is hard to aim is hit easily, and hence the player feels less frustrated and is prevented from losing an interest in the game.

In an eighteenth aspect of the present embodiment based on the twelfth aspect, the game program further causes the computer to operate as scene data storage means for storing in a predetermined storage means a plurality of scene data concerning scenes in which shooting is performed in the virtual space. Further, the target setting means sets a different time as the target time depending on the scene data.

According to the eighteenth aspect, each scene in the game is provided with a feature, and hence the game is prevented from being monotonized.

In a nineteenth aspect of the present embodiment based on the twelfth aspect, the game program further causes the computer to operate as: blocking time measuring means for measuring a blocking time for which a shield exists between the object for which the target time is set and the aiming point coordinate in the virtual space; and target cancellation means for deleting the setting of the target time when the blocking time exceeds a predetermined time.

According to the nineteenth aspect, the reality of the game is enhanced, and hence the fun of the game is enhanced.

In a twentieth aspect of the present embodiment based on the first aspect, the game program further causes the computer to operate as: blocking time measuring means (S23) for measuring a blocking time for which a shield exists between the object for which the target time is set and the aiming point coordinate in the virtual space; and target cancellation means (S24) for deleting the setting of the target time when the blocking time exceeds a predetermined time.

According to the twentieth aspect, the reality of the game is enhanced, and hence the fun of the game is enhanced.

A twenty-first aspect of the present embodiment is a game apparatus which displays on a game screen a scene of shooting at an object existing in a virtual space based on an input from an input device (7), the game apparatus comprising aiming point coordinate acceptance means (10), aiming point determination means (10), target setting means (10), shooting operation acceptance means (10), shooting processing means (10), and target resetting means (10). The aiming point coordinate acceptance means is means for accepting from the input device an input of an aiming point coordinate indicating a position of an aiming point in the game screen. The aiming point determination means is means for determining whether or not the aiming point overlaps with the object based on the aiming point coordinate accepted by the aiming point coordinate acceptance means. The target setting means is means for setting a target time for which the object overlapped by the aiming point becomes a target of shooting such that the target time is correlated with the object when the aiming point determination means determines that the aiming point overlaps with the object. The shooting operation acceptance means is means for accepting a shooting operation with respect to the virtual space from the input device. The shooting processing means is means for performing shooting at the object for which the target time is set in the virtual space irrespective of the position of the aiming point when the shooting operation acceptance means accepts the shooting operation within the target time after the target setting means sets the target time for the object. The target resetting means is means for resetting the target time for the object which has become the target of shooting when the shooting operation acceptance means accepts the shooting operation within the target time.

According to the twenty-first aspect, the same advantageous effect as the first aspect is obtained.

According to the present embodiment, in a shooting game, it is possible for a player to shoot a target without feeling the difference between a position at which the player intends to take aim and an actual position of an aiming point. Thus, the player is prevented from being frustrated due to the above difference, and losing an interest in the game.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 13 shows an example of a data structure of a weapon master 126;

FIG. 14 shows an example of a data structure of an object master 127;

FIG. 15 shows an example of a data structure of an appearing object data 128;

FIG. 16 shows an example of a data structure of a target data 129;

DESCRIPTION OF THE PREFERRED EMBODIMENTS

The following will describe an embodiment with reference to the drawings. It is noted that the present technology is not limited to the embodiment.

(Whole Structure of Game System)

Figure 1:
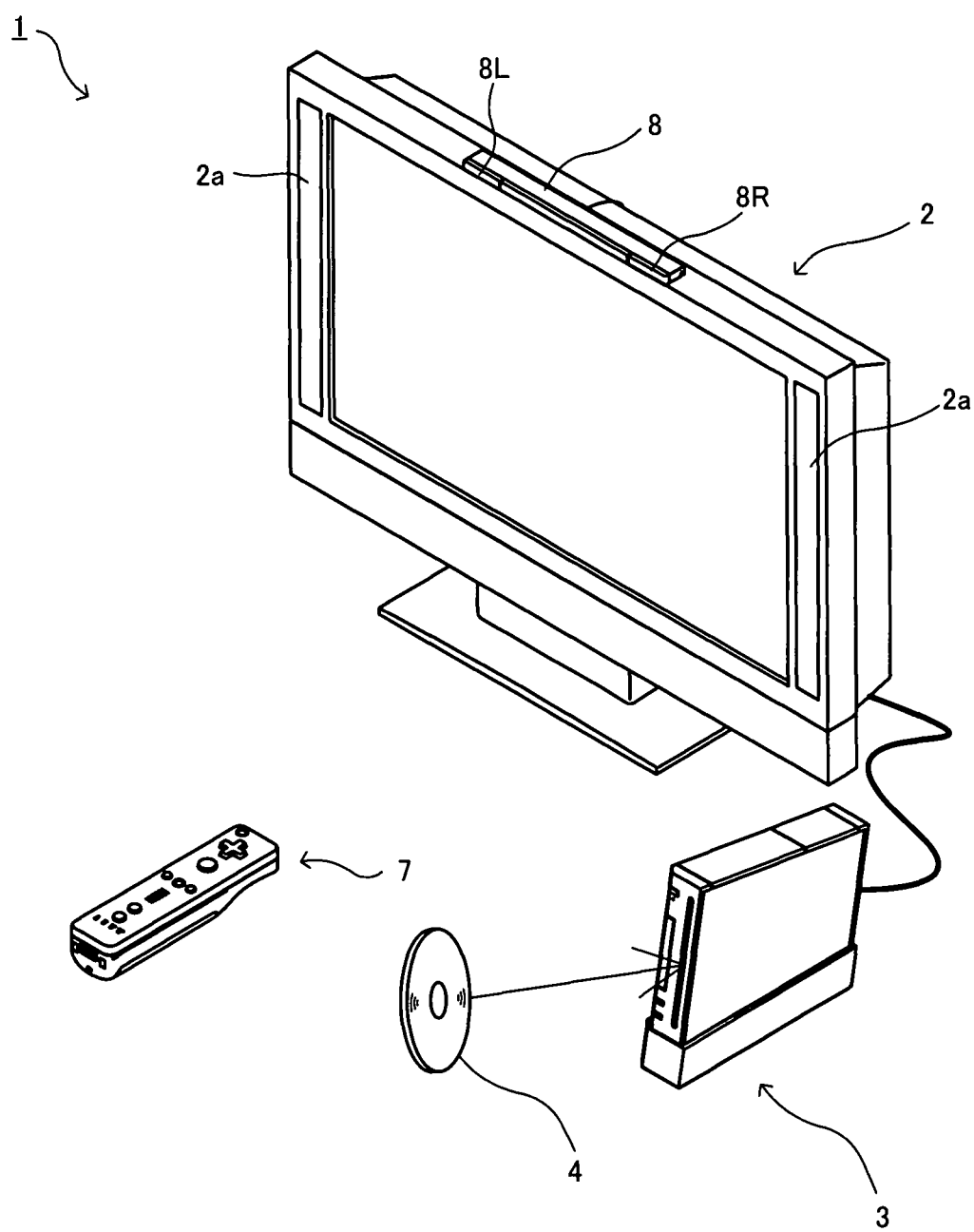
FIG. 1 is an external view illustrating a game system 1 according to an embodiment.

With reference to FIG. 1, the following will describe a game system 1 including a game apparatus according to an example embodiment. FIG. 1 is an external view illustrating the game system 1. Hereinafter, the game system 1 using a stationary game apparatus will be used as an example, and the game apparatus and the game program according to the present invention will be described. As shown in FIG. 1, the game system 1 comprises a television receiver 2 (hereinafter, referred to as a television), a game apparatus 3, an optical disc 4, a controller 7, and a marker section 8. The game system 1 executes game processing at the game apparatus 3 in accordance with game operation using the controller 7.

The optical disc 4 as an example of an exchangeable information storage medium replaceably used is detachably inserted in the game apparatus 3. The optical disc 4 stores a game program which is to be executed by the game apparatus 3. The game apparatus 3 has at its front surface an insertion slot. The game apparatus 3 reads and executes the game program stored in the optical disc 4 which is inserted in the insertion slot for executing the game processing.

The television 2 as an example of a display device is connected to the game apparatus 3 through a connection cord. The television 2 displays a game image which is obtained as the result of the game processing executed by the game apparatus 3. The marker section 8 is mounted adjacent to the screen of the television 2 (on the upper surface of the screen in FIG. 1). The marker section 8 has at its opposite ends a marker 8R and a marker 8L, respectively. The marker 8R has one or more infrared LEDs which output infrared lights forward from the television 2. The marker 8L has the same configuration as the marker 8R. The marker section 8 is connected to the game apparatus 3, and the game apparatus 3 is capable of controlling illumination of each infrared LED of the marker section 8.

The controller 7 is an input device which provides the game apparatus 3 with operation data which indicates the content of operation made to the controller 7. The controller 7 is connected to the game apparatus 3 by radio communication. In the embodiment, the technology of, for example, Bluetooth (registered trademark), is used for the radio communication between the controller 7 and the game apparatus 3. It is noted that the controller 7 may be connected to the game apparatus 3 through a wire.

(Internal Structure of Game Apparatus 3)

Figure 2:
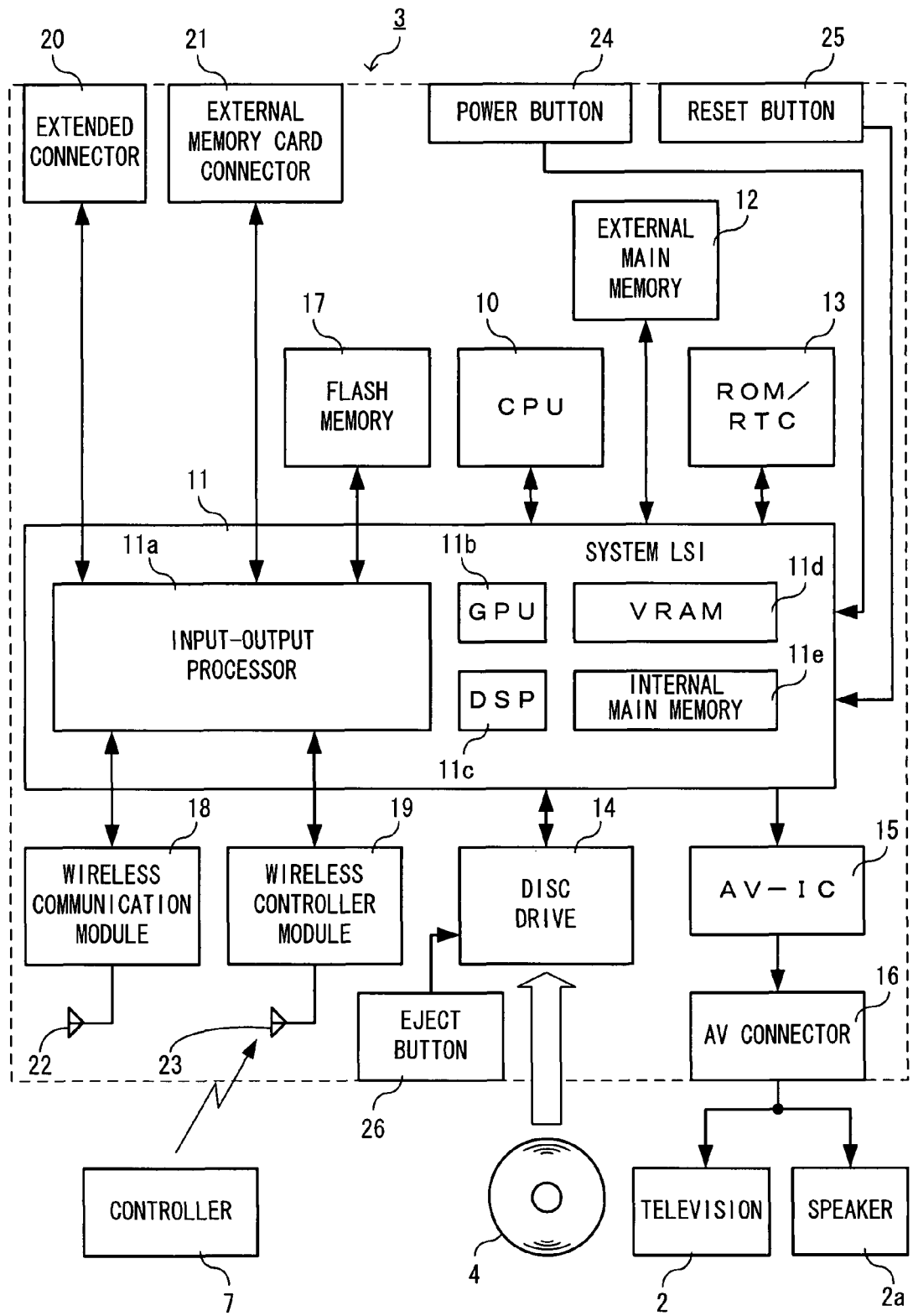
FIG. 2 is a functional block diagram of a game apparatus 3 shown in FIG. 1.

The following will describe an internal structure of the game apparatus 3 with reference to FIG. 2. FIG. 2 is a block diagram of the game apparatus 3. The game apparatus 3 includes a CPU 10, a system LSI 11, an external main memory 12, a ROM/RTC 13, a disc drive 14, and an AV-IC 15.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transmission between the system LSI 11 and each element connected thereto, generation of an image to be displayed, obtaining data from an external device, and the like. The internal structure of the system LSI will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (or a boot ROM) which stores a program for starting up the game apparatus 3, and a clock circuit (RTC: Real Time Rom) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these elements 11a to 11e are connected to each other through an internal bus.

The GPU 11b is a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data, texture data, and the like, which are required for the GPU 11b to execute the graphics command. In generating an image, the GPU 11b creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the sound data generated thus are read by the AV-IC 15. The AV-IC 15 outputs the image data to the television 2 through an AV connector 16, and the sound data to a speaker 2a built in the television 2. Thus, an image is displayed on the television 2, and sound is outputted from the speaker 2a.

The input-output processor (I/O process) 11a performs transmission and reception of data to and from each element connected to the input-output processor 11a, and downloads data from an external device. The input-output processor 11a is connected to the flash memory 17, a wireless communication module 18, a wireless controller module 19, an extended connector 20, and an external memory card connector 21. An antenna 22 is connected to the wireless communication module 18, and an antenna 23 to the wireless controller module 19.

The input-output processor 11a is connected to a network through the wireless communication module 18 and the antenna 22, so that the input-output processor 11a is communicable to another game apparatus connected to the network and various servers. The input-output processor 11a periodically accesses the flash memory 17 to detect whether there are data required to be transmitted to the network. If there are such data, the input-output processor 11a transmits the data to the network through the wireless communication module 18 and the antenna 22. The input-output processor 11a receives data transmitted from the other game apparatus and data downloaded from a download server through the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus 3 and the other game apparatus and various servers, the flash memory 17 may store saved data (result data or midstream data of the game) of the game played using the game apparatus 3.

The input-output processor 11a receives operation data transmitted from the controller 7 through the antenna 23 and the wireless controller module 19, and stores (temporarily stores) the operation data in the buffer region of the internal main memory 11e or the external main memory 12.

The extended connector 20 and the external memory card connector 21 are connected to the input-output processor 11a. The extended connector 20 is a connector for an interface such as USB and SCSI, and the communication to the network is enabled by connecting a medium such as an external storage medium, a peripheral device such as another controller, or a wired connector for communication to the extended connector 20 instead of the wireless communication module 18. The external memory card connector 21 is a connector for connecting thereto an external storage medium such as a memory card. For example, the input-output processor 11a accesses the external storage medium through the extended connector 20 and the external memory card connector 21 for storing data and reading data.

The game apparatus 3 is provided with a power button 24, a reset button 25, and an eject button 26. The power button 24 and the reset button 25 are connected to the system LSI 11. When the power button 24 is turned on, electric power is supplied to each element of the game apparatus 3 through an AC adaptor (not shown). After the power is turned on, the power button 24 is pressed to shift to a low power standby mode. Even in this state, electric power is supplied to the game apparatus 3. Thus, the game apparatus 3 can be always connected to a network such as the Internet. It is noted that in turning off the power once the power is turned on, the power button 24 is pressed for a predetermined period of time or longer to turn off the power. The reset button 25 is pressed to make the system LSI 11 restart a boot program of the game apparatus 3. The eject button 26 is connected to the disc drive 14. The eject button 26 is pressed to eject the optical disc 4 from the disc drive 14.

Figure 3:
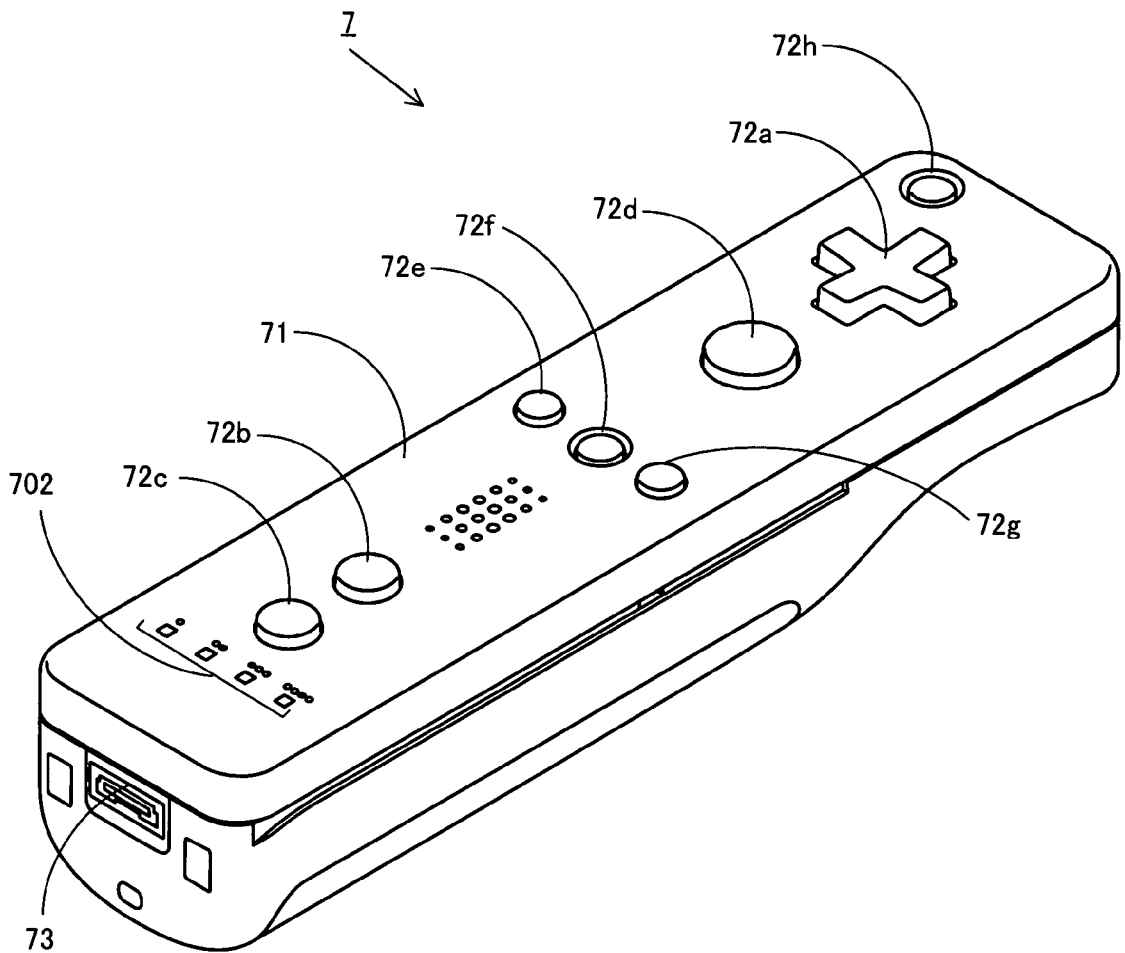
FIG. 3 is a perspective view of a controller 7 of FIG. 1 seen from a top rear side thereof.
Figure 3:
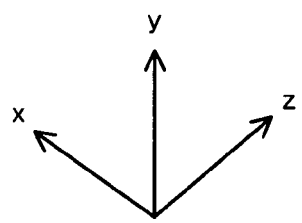
Figure 4:
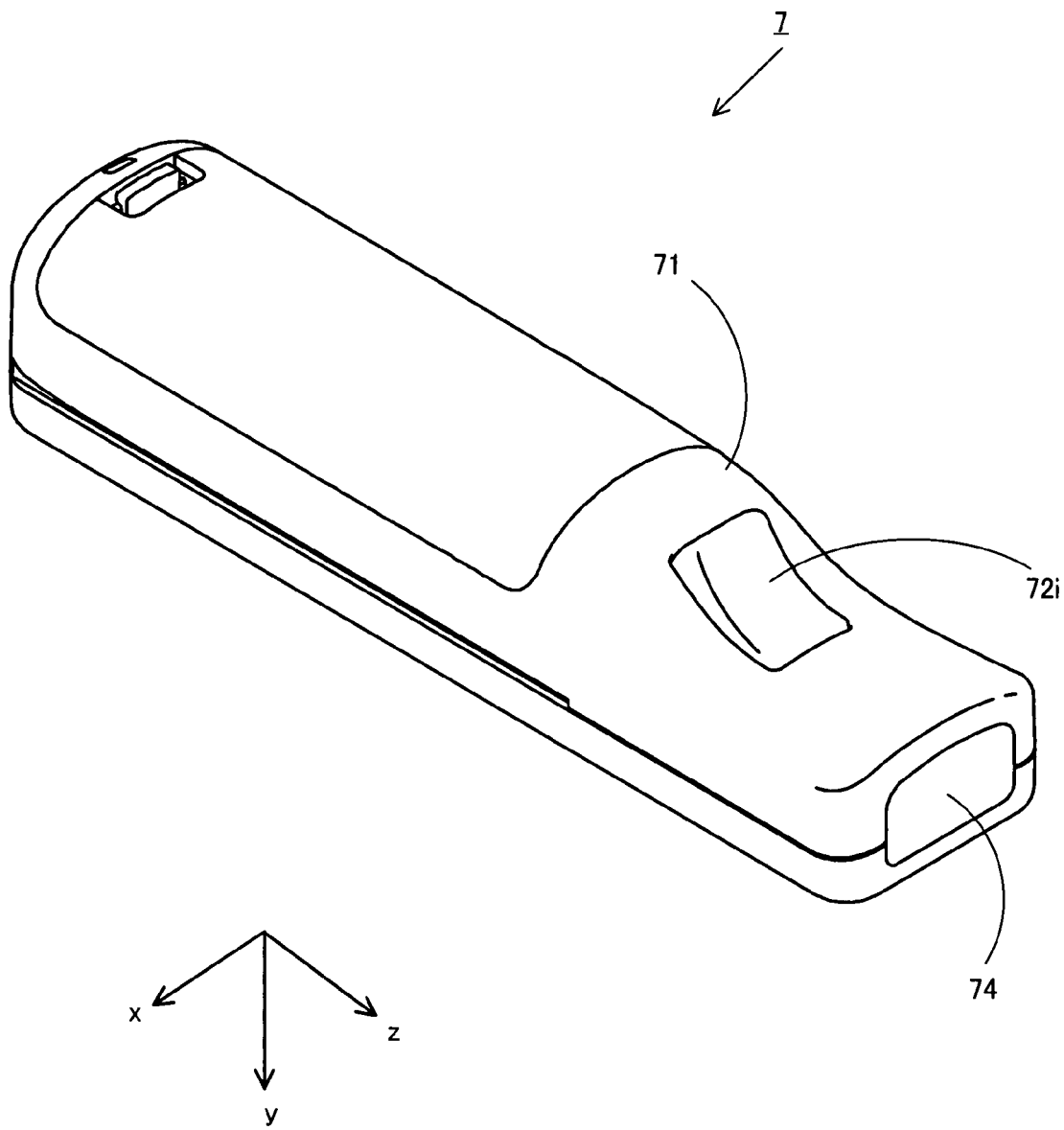
FIG. 4 is a perspective view of the controller 7 of FIG. 3 seen from a bottom front side thereof.

The following will describe the controller 7 with reference to FIGS. 3 and 4. FIG. 3 is a perspective view of a controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 including a plurality of operation buttons which are provided on surfaces of the housing 71. The housing 71 of the embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touch pad. Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player of the controller type which is currently set for the controller 7. Specifically, when the controller 7 transmits transmission data to a receiving unit 6, one of the plurality of LEDs 702 which corresponds to the controller type of the controller 7 is lit up.

On the top surface of the housing 71, a plurality of holes is provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72*i* is provided. The operation button 72*i* is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

In order to give a specific description, a coordinate system set for the controller 7 will be defined. As shown in FIGS. 3 and 4, x axis, y axis, and z axis perpendicular to each other are defined for the controller 7. More specifically, the longitudinal direction of the controller 7 from front to rear corresponds to z axis, and the direction toward the front surface of the controller 7 (the surface in which the imaging information calculation section 74) is a positive direction of z axis. The up-down direction of the controller 7 corresponds to y axis, and the direction toward the top surface (the surface on which the operation button 72*a* and the like are provided) is a positive direction of y axis. The left-right direction of the controller 7 corresponds to x axis, and the direction toward the left side surface (the side surface which is not shown in FIG. 3 but shown in FIG. 4) is a positive direction of x axis.

Figure 5:
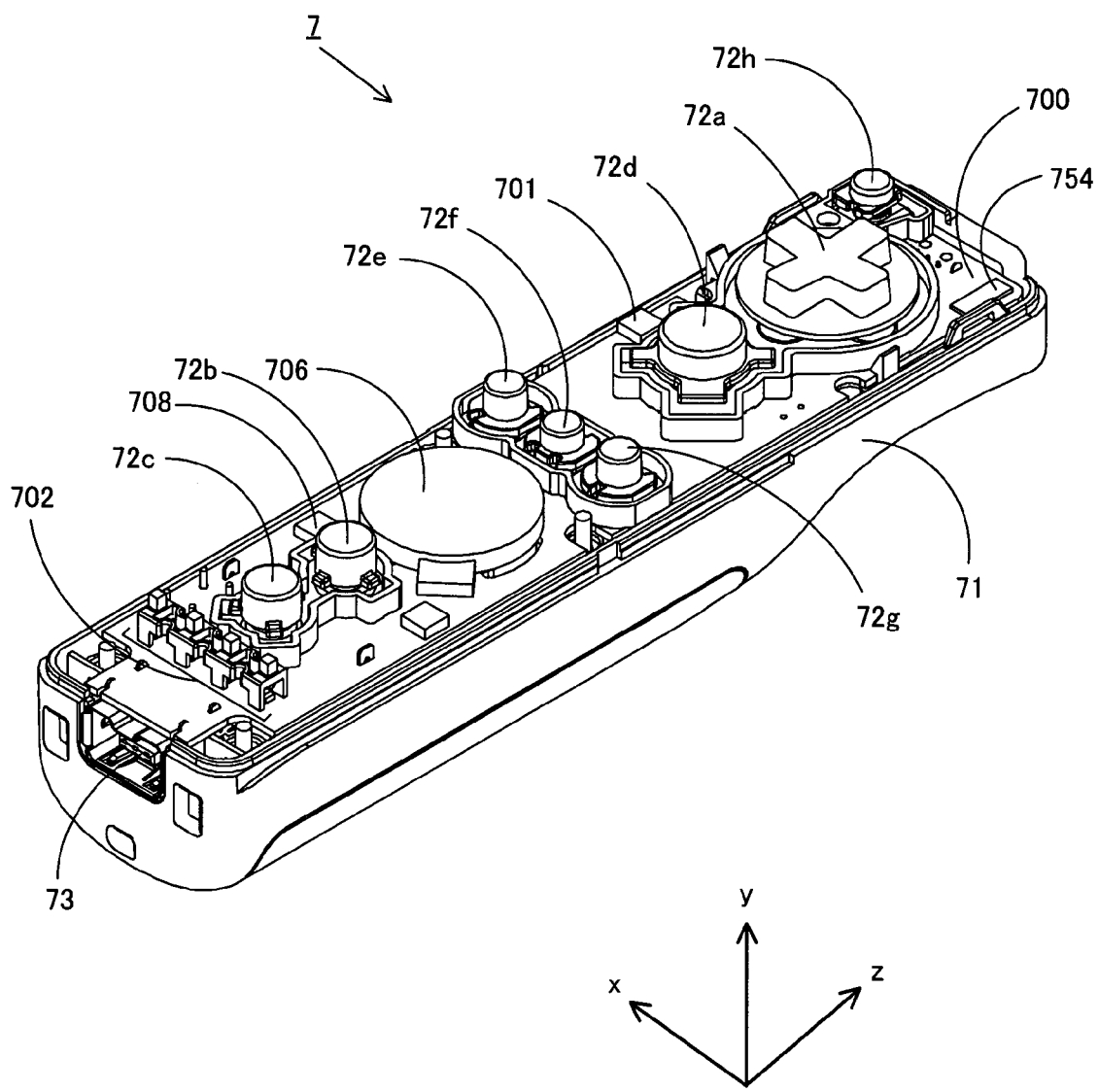
FIG. 5 is a perspective view illustrating a state where an upper housing of the controller 7 of FIG. 3 is removed.
Figure 6:
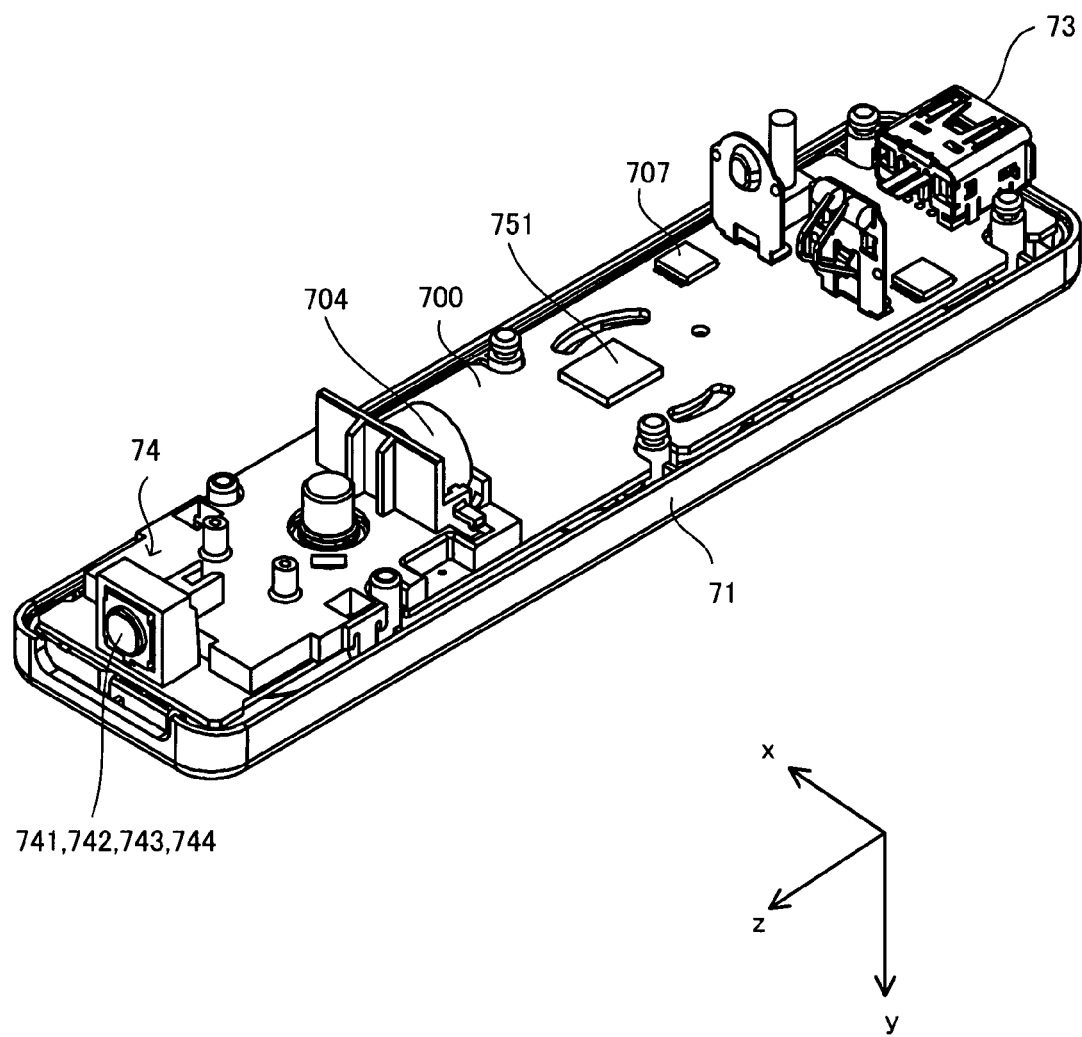
FIG. 6 is a perspective view illustrating a state where a lower housing of the controller 7 of FIG. 3 is removed.

The following will describe an internal structure of the controller 7 with reference to FIGS. 5 and 6. FIG. 5 is a perspective view illustrating a state where an upper housing (a part of the housing 71) of the controller 7 is removed as seen from a rear side thereof. FIG. 6 is a perspective view illustrating a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72*a* to 72*h*, an acceleration sensor 701, the LEDs 702, and an antenna 754 and the like are provided. These elements are connected to a microcomputer 751 (see FIGS. 6 and 7) by lines (not shown) formed on the substrate 700 and the like. The microcomputer 751 as an example of button data generation means of the present invention functions to generate operation button data in accordance with a type of the operation button 72*a* and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line where the current conduction occurs leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided.

The acceleration sensor 701 is provided on the left side of the operation button 72*d* on the substrate 700 (or on the periphery of the substrate 700, not on the center thereof). The acceleration sensor 701 is capable of detecting acceleration included in a component caused by a centrifugal force in accordance with rotation of the controller 7 about the longitudinal direction, in addition to change of direction of gravitational acceleration. Thus, the game apparatus 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 through the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated and unactuated in accordance with vibration data transmitted from the game apparatus 3. The controller 7 is vibrated by an actuation of the vibrator 704, and the vibration is conveyed to the player holding the controller 7. Thus, a so-called vibration-feedback game is realized. Since the vibrator 704 is located in the front portion of the housing 71, the housing 71 is vibrated substantially, and hence the player holding the controller 7 easily feels the vibration.

Figure 7:
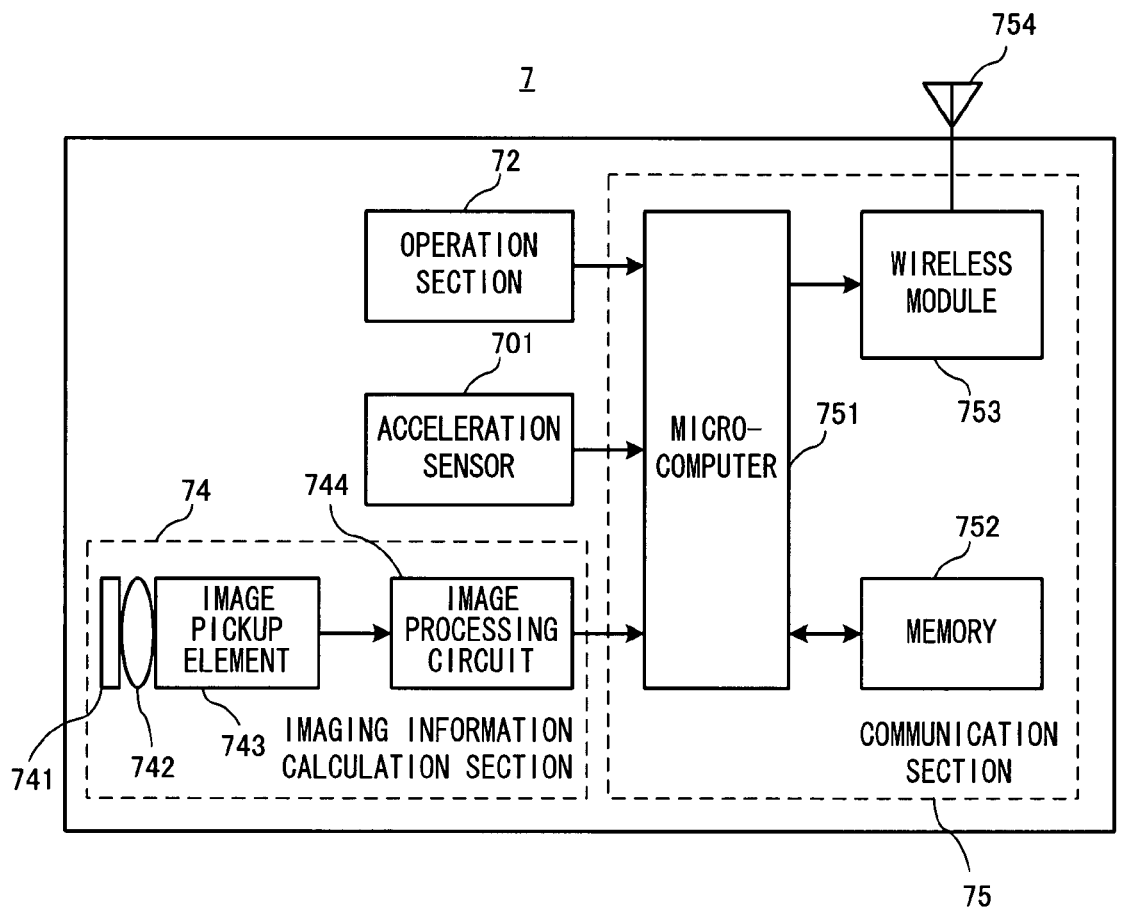
FIG. 7 is a block diagram showing an internal structure of the controller 7 of FIG. 3.

The following will describe an internal structure of the controller 7 with reference to FIG. 7. FIG. 7 is a block diagram showing the internal structure of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs to the communication section 75 process result data indicating, e.g., a calculated coordinate position, square measure of the area. The imaging information calculation section 74 is fixed to the housing 71 of the controller 7. An imaging direction of the imaging information calculation section 74 can be changed by changing a facing direction of the housing 71. As described later in detail, a signal corresponding to a position and motion of the controller 7 is obtained in accordance with the process result data outputted from the imaging information calculation section 74.

It is preferable that the controller 7 include the three-axis (x axis, y axis, and z axis) acceleration sensor 701. The three-axis acceleration sensor 701 detects linear acceleration of the controller 7 for three axial directions of the controller 7, i.e., an up-down direction, a left-right direction, and a front-rear direction of the controller 7. As the acceleration sensor 701, a two-axis accelerometer for detecting linear acceleration of the controller 7 along each of the up-down direction and the left-right direction (the other pair of axes), may be alternatively used depending on a type of the operation signal used in the game processing. As a non-limiting example, the three-axis or two-axis acceleration sensor 701 may be of the type available from Analog Devices, Inc. or STMicroelectronics N.V. The acceleration sensor 701 may be an electrostatic capacitance or capacitance-coupling type which is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through processing by a computer such as the processor of a game apparatus (e.g. the CPU 10) or the processor of a controller (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is tilted relative to the direction of gravity or how many degrees the controller 7 is tilted relative to the direction of gravity. More specifically, when a state where the detection axis of the acceleration sensor 701 extends in a vertically-down direction is set as a standard state, it is possible to determine whether or not the controller 7 is tilted by determining whether 1G (gravitational acceleration) is applied to the acceleration sensor 701, and how many degrees the controller 7 is tilted by determining the magnitude of the gravitational acceleration. In addition, a multi-axis acceleration sensor is used to determine in detail how many degrees each axis is tilted relative to the direction of gravity through processing of an acceleration signal for each axis. In this case, a processor may perform processing based on the output from the acceleration sensor 701 for calculating tilt angle data of the controller 7. Alternatively, processing may be performed so as to infer rough tilt based on the output from the acceleration sensor 701 without calculating the tilt angle data. As described above, the acceleration sensor 701 can be used in combination with the processor to determine tilt, attitude or position of the controller 7. On the other hand, on the assumption that the acceleration sensor 701 is in dynamic state, acceleration corresponding to motion of the acceleration sensor 701 is detected in addition to gravitational acceleration. Thus, it is possible to determine the direction of the motion by removing a gravitational acceleration component through predetermined processing. More specifically, various movements and/or positions of the controller 7 can be calculated or inferred through processing of the acceleration signals generated by the acceleration sensor 701 when the controller 7 including the acceleration sensor 701 is subjected to dynamic accelerations by the hand of a user. It is noted that even on the assumption that the acceleration sensor 701 is in dynamic state, it is possible to determine tilt relative to the direction of gravity by removing acceleration corresponding to motion of the acceleration sensor 701 through predetermined processing. In another embodiment, the acceleration sensor 701 may include an embedded signal processor or other type of dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor is intended to detect static acceleration (i.e., gravitational acceleration).

In another exemplary embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the acceleration sensor 701, a gyro-sensor is capable of directly detecting rotation (or angular rate) around an axis defined by a gyroscopic element (or elements) therein. Thus, due to the fundamental differences between a gyro-sensor and an acceleration sensor, corresponding changes need to be made to the processing operations that are performed on the output signals from these devices depending on which device is selected for a particular application.

More specifically, when a gyro-sensor is used instead of an acceleration sensor to calculate tilt and attitude, significant changes are necessary. More specifically, when a gyro-sensor is used, the value of tilt is initialized at the start of detection. Then, data on angular velocity which is outputted from the gyro-sensor is integrated. Furthermore, a change amount in tilt from the value of tile previously initialized is calculated. In this case, the calculated tilt is determined as a value corresponding to an angle. In contrast, when an acceleration sensor is used, tilt is calculated by comparing the value of the gravitational acceleration of each axial component with a predetermined reference. Therefore, the calculated tilt can be represented as a vector. Thus, without initialization, an absolute direction can be determined with an accelerometer. The type of the value calculated as a tilt is also very different between a gyro-sensor and an accelerometer; i.e., the value is an angle when a gyro-sensor is used and is a vector when an accelerometer is used. Therefore, when a gyro-sensor is used instead of an acceleration sensor, data on tilt also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus 3 through the antenna 754. The sound IC 707 processes the sound data and the like transmitted from the game apparatus 3 through the communication section 75. The microcomputer 751 actuates the vibrator 704 in accordance with the vibration data (e.g. signals for actuating and unactuating the vibrator 704) transmitted from the game apparatus 3 through the communication section 75.

Data from the controller 7 such as an operation signal (key data) from the operation section 72, acceleration signals (acceleration data of directions of x axis, y axis, and z axis which is hereinafter referred to merely as acceleration data.) from the acceleration sensor 701, and the process result data from the imaging information calculation section 74 are outputted to the microcomputer 751. The microcomputer 751 temporarily stores inputted data (the key data, the acceleration data and the process result data) in the memory 752 as the transmission data which is to be transmitted to the communication unit 6. Radio transmission from the communication section 75 to the communication unit 6 is performed at predetermined time intervals. Since game processing is generally performed at a cycle of 1/60 sec, the radio transmission needs to be performed at a cycle of a shorter time period. Specifically, game processing is performed at a cycle of 16.7 ms (1/60 sec), and a transmission interval of the communication section 75 structured using the Bluetooth (registered trademark) technology is 5 ms. At a timing of performing a radio transmission to the communication unit 6, the microcomputer 751 outputs to the wireless module 753 the transmission data stored in the memory 752 as a series of pieces of operation information. The wireless module 753 uses, for example, the Bluetooth (registered trademark) technology to modulates the series of pieces of operation information onto a carrier wave of a predetermined frequency, and radiates a resultant radio signal from the antenna 754. Thus, the key data from the operation section 72, the acceleration data from the acceleration sensor 701, and the process result data from the imaging information calculation section 74 are modulated onto a radio signal by the wireless module 753 and transmitted from the controller 7. The communication unit 6 of the game apparatus 3 receives the radio signal, and the game apparatus 3 demodulates or decodes the radio signal to obtain the series of pieces of operation information (the key data, the acceleration data and the process result data). In accordance with the series of pieces of obtained operation information and the game program, the CPU 10 of the game apparatus 3 performs the game processing. In the case where the communication section 75 is structured using the Bluetooth (registered trademark) technology, the communication section 75 can have a function of receiving transmission data which is wirelessly transmitted from the other devices.

Figure 8:
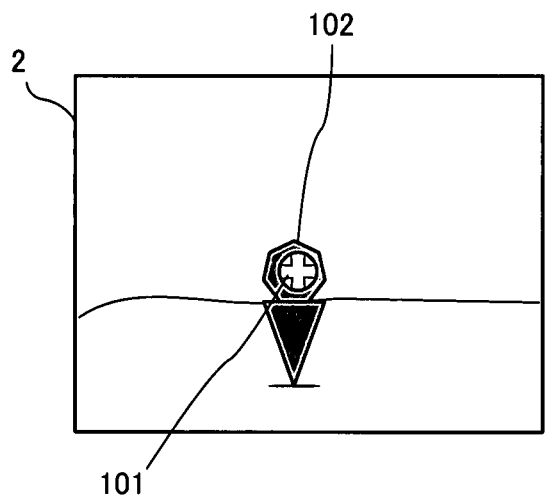
FIG. 8 is a view of an example of a game screen assumed in the embodiment.
Figure 9:
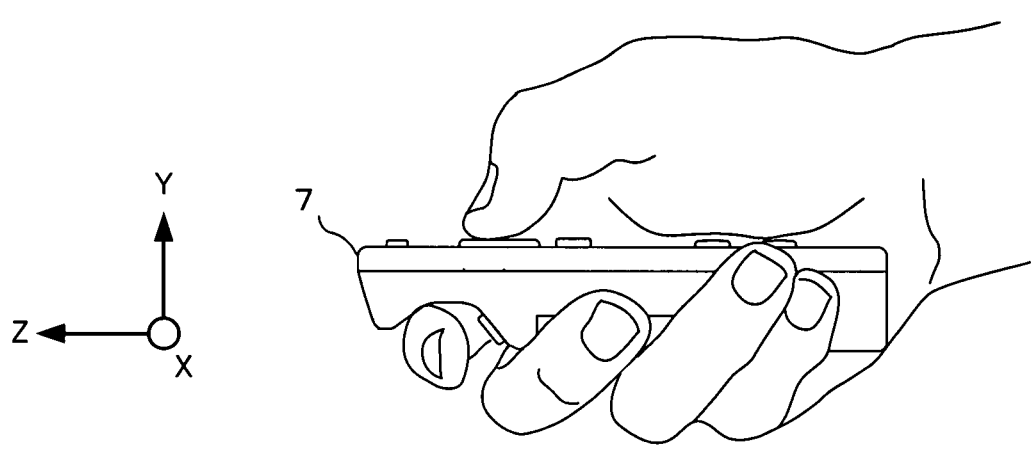
FIG. 9 is a view illustrating an example of a manner of operation.

The following will describe the outline of the game assumed by the embodiment with reference to FIGS. 8 to 11. FIG. 8 is a view of an example of a game screen assumed in the embodiment. The game is a shooting game (gun shooting, or FPS), and the controller 7 is used like a shooting weapon (the shooting weapon is a crossbow in the embodiment). The operation of the controller 7 will be described. For example, as shown in FIG. 9, the player holds the controller 7 such that the front surface of the controller 7 (the side on which a light an image of which is taken by the imaging information calculation section 74 is incident) faces the markers 8L and 8R. In this state, the player performs a game operation by tilting the controller 7 and changing a position to which the controller 7 points in the game screen (a pointing position). In place of the controller 7, a dedicated controller shaped into a shooting weapon such as a gun, a crossbow or the like may be used. Alternatively, the controller 7 may be fitted in an attachment shaped into a gun or a crossbow.

In the game screen of FIG. 8 showing a three-dimensional virtual game space (hereinafter referred to merely as virtual game space), an aiming cursor 101 and an enemy object 102 are displayed. The aiming cursor 101 is displayed at the pointing position pointed by the controller 7. In other words, the player operates the controller 7 so as to move its pointing position, thereby moving the aiming cursor 101 in the game screen. When a shooting operation is performed or the operation button 72i is pressed with the aiming cursor 101 aligned with the enemy object 102, an arrow is released from the crossbow as a weapon of the player and flies to the enemy object 102 in the virtual game space. If an arrow hit the enemy object 102, a corresponding processing (e.g. damage is given to the enemy object) is performed. Repeating such a operation, the player shoots the enemy object 102 appearing in the virtual game space.

Figure 10:
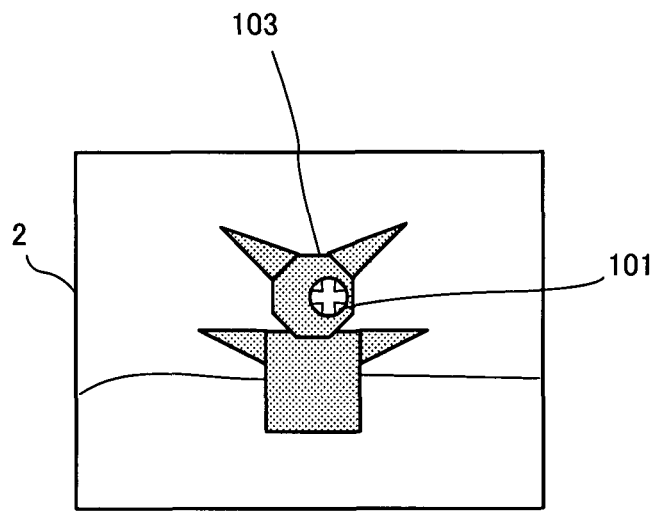
FIG. 10 is a view of another example of the game screen assumed in the embodiment.
Figure 11:
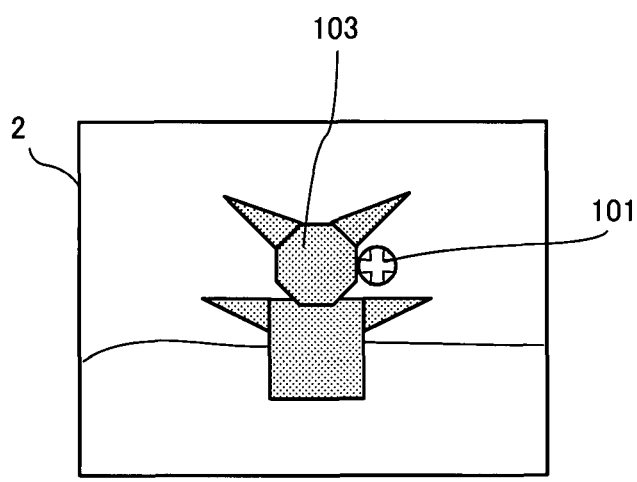
FIG. 11 is a view of another example of the game screen assumed in the embodiment.

For enemy objects appearing in the game, parameters as HP (Hit Point) are set. For the crossbow, a parameter as an offensive power is set. The HPs of most enemy objects are set such the enemy objects are eliminated by a hit with an arrow. However, in addition to such enemy objects, large-size enemy objects (hereinafter referred to as strong enemy object) which are eliminated by hits with several dozen of arrows appear in the game. FIG. 10 is a view of an example of a game screen in which a strong enemy object 103 appears. In order to eliminate the strong enemy object 103, several dozen of arrows need to hit the strong enemy object 103 as mentioned above. Thus, with the aiming cursor 101 aligned with the strong enemy object 103, shooting operations need to be performed repeatedly for many times. Continuation of such operations causes fatigue of an arm and shake of a hand. Due to this, the player may unconsciously move the position of the aiming cursor 101 from the intended position. Thus, even the player intends to align the aiming cursor 101 with the strong enemy object 103, the aiming cursor 101 (an aiming point) may actually be positioned out of the strong enemy object 103 as shown in FIG. 11. In the present invention, correction processing is performed which makes an arrow hit a strong enemy object 103 when shooting operations are continued even if the aiming cursor 101 is positioned out of the strong enemy object 103 more or less. More specifically, the following processing is performed. Once the aiming cursor 101 overlaps with the strong enemy object 103 by an operation of the player, target setting is performed for the strong enemy object 103. The target setting means to set such that an arrow is to be discharged toward the strong enemy object 103 irrespective of a current position of the aiming cursor 101 (even though the aiming cursor 101 is not currently aligned with the strong enemy object 103). Concurrently with the target setting, a correction valid time is set (e.g. 30 ms). Unless a shooting operation is performed within the correction valid time, the target setting is cancelled. If so, an arrow is discharged in a direction in which the aiming cursor 101 points by a subsequent shooting operation. On the other hand, when a shooting operation is performed within the correction valid time, an arrow is discharged toward the strong enemy object 103 for which the target setting is set thus. When a shooting operation is performed within the correction valid time, the correction valid time is also reset (e.g. the correction valid time is reset at an initial value). Therefore, shooting operations are repeatedly performed within the correction valid time thereby to be able to continuously discharge arrows to an enemy object for which target setting is set. Even though the aiming cursor 101 is positioned out of the strong enemy object 103 as shown in FIG. 11, continuation of shooting operations within the correction valid time enables arrows to be discharged to the strong enemy object 103. As a result, the arrows continuously hit the strong enemy object 103 to give damage thereto.

By performing such processing, a bullet (an arrow) is prevented from missing the enemy object due to the fact that the player unconsciously moves the aiming point out of the enemy object while repeating shooting operations for shooting the same enemy object. Thus, the player plays the game without feeling frustrated.

Figure 12:
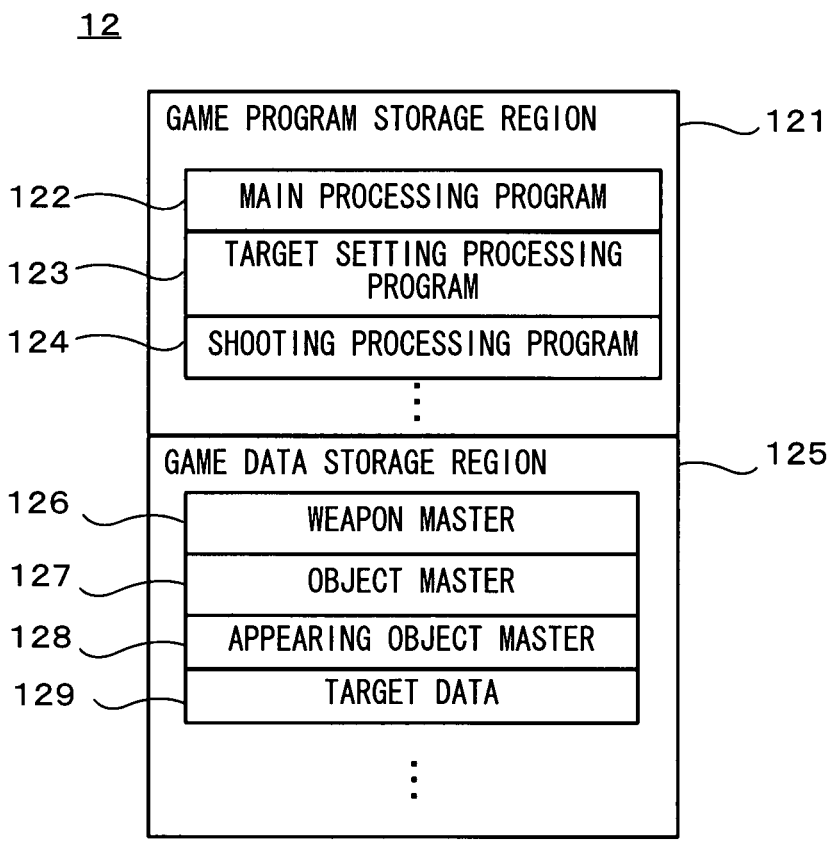
FIG. 12 shows a memory map of an external main memory 12.

The following will describe in detail the game processing executed by the game apparatus 3. First, data stored in the external main memory 12 (alternatively, data may be stored in the internal main memory 11e or in both of the memories.) in the game processing will be descried. FIG. 12 shows a memory map of an external main memory 12 of the game apparatus 3. As shown in FIG. 12, the external main memory 12 includes a game program storage region 121 and a game data storage region 125. Data of the game program storage region 121 and the game data storage region 125 are stored in the optical disc 4, and, in executing the game program, transmitted to the external main memory 12 and stored therein. For convenience of explanation, each data is described in the form of table data. However, these data do not have to be stored in the form of table data. Alternatively, processing of content corresponding to the table may be stored in the game program.

Figure 17:
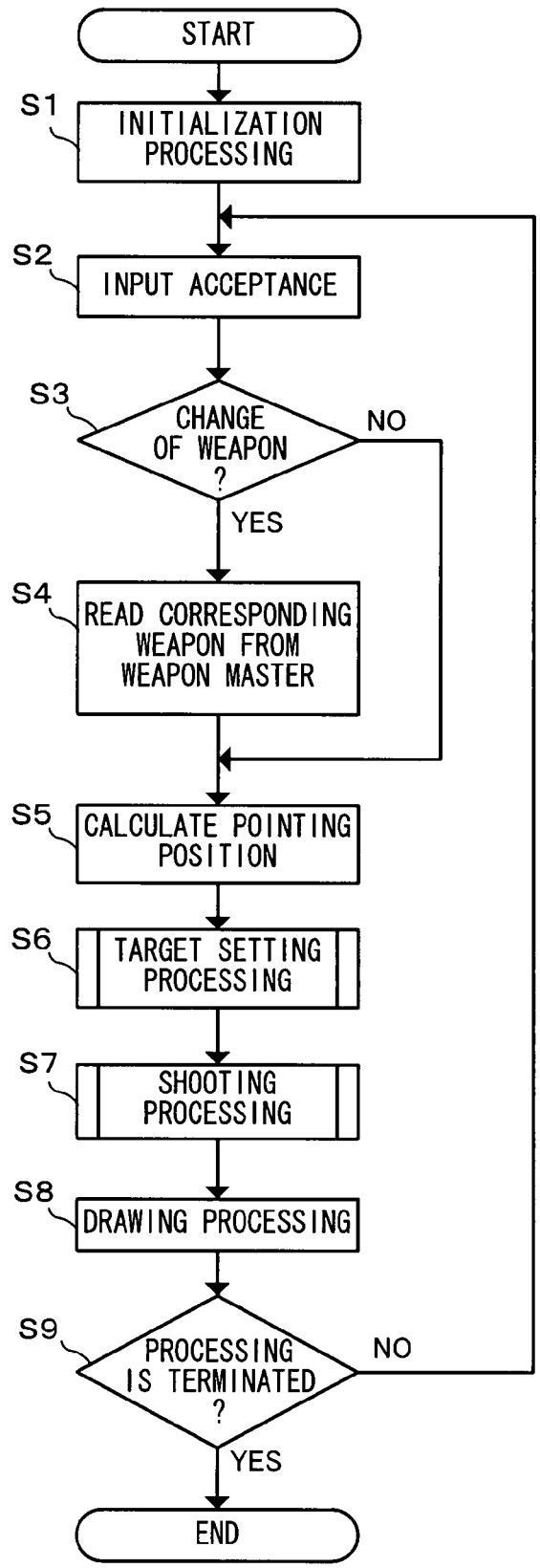
FIG. 17 is a flow chart showing whole game processing of the embodiment.

The game program storage region 121 stores the game program executed by the CPU 10, and the game program includes a main processing program 122, a target setting processing program 123, a shooting processing program 124, and the like. The main processing program 122 is a program for executing processing of a flow chart which is shown in FIG. 17 and which will be described later. The target setting processing program 123 is a program for achieving the target setting described above. The shooting processing program 124 is a program for executing processing concerning an attack operation by the above shooting weapon.

The game data storage region 125 stores data such as a weapon master 126, an object master 127, appearing object data 128, target data 129 and the like, and also stores various data and flags which are required for the game processing, such as data indicating various scenes in the virtual game space (positional and geographic data indicating plain, forest and the like, data indicating time zone such as daytime, nighttime and the like).

The weapon master 126 is a table defining weapons which the player can use in the game. In the game, the player can selectively use a plurality of weapons, and information and parameters on each weapon are defined as the weapon master 126. FIG. 13 shows an example of a data structure of the weapon master 126. The weapon master 126 includes a weapon ID 1261, an offensive power 1262, and a maximum flying distance 1263. The weapon ID 1261 is an ID for identifying each weapon. The offensive power 1262 is data defining an offensive power of each weapon, and, for example, as to a crossbow, an offensive power for an arrow is indicated. According to the offensive power, HP of an enemy object is reduced. The maximum flying distance 1263 is data indicating a range of each weapon.

The object master 127 is a table defining objects (the enemy object 102, the strong enemy object 103, and the like) appearing in the game. FIG. 14 shows an example of a data structure of the object master 127. The object master 127 includes an object ID 1271 and an HP 1272. The object ID 1271 is an ID for identifying the above enemy object 102 and the above strong enemy object 103. The HP 1272 is a value for indicating strength of each object. Although not shown in the drawings, other various parameters such as an offensive force and a defensive force are defined in the object master 127.

The appearing object data 128 are data concerning the enemy object and the strong enemy object appearing in the virtual game space (e.g. in a current stage if a game course is divided into a plurality of stages) in which a current play is performed. FIG. 15 shows an example of a data structure of the appearing object data 128. The appearing object data 128 includes an object ID 1281, a position coordinate 1282, and a remaining HP 1283. The object ID 1281 is an ID for identifying each appearing object, and corresponds to the object ID 1271 of the object master 127. The position coordinate 1282 is data indicating a position of each appearing object in the virtual game space. The remaining HP 1283 is a value indicating a remain of HP of each appearing object.

The target data 129 are data concerning the enemy object 102 or the strong enemy object 103 for which the above target setting has been set (hereinafter, both of the objects are referred to merely as enemy object). In other words, data concerning an enemy object for which the target setting has been set are stored in the target data 129. FIG. 16 shows an example of a data structure of the target data 129. The target data 129 includes an object ID 1291, a weapon ID 1292, a correction valid time 1293, and a blocking time 1294. The object ID 1291 indicates an object ID for the enemy object for which the target setting has been set. The weapon ID 1292 is data indicating a weapon used for attacking the enemy object for which the target setting has been set, and corresponds to the weapon ID 1261 of the weapon master 126. The correction valid time 1293 is data indicating a period of time for accepting a shooting operation to which the above correction is made. When a shooting operation is performed before the correction valid time becomes zero, an arrow is discharged toward the enemy object for which the target setting has been set. The blocking time 1294 is data indicating a period of time during which an obstacle or the like blocks the object for which the target setting has been set.

The following will describe the detailed operation of the game processing executed by the game apparatus 3 with reference to FIGS. 17 to 24. FIG. 17 is a flow chart showing the whole game processing executed by the game apparatus 3. In step S1, initialization processing is executed on data used in the following processing. More specifically, the target data 129 are emptied, and stored in the external main memory 12. A weapon which a player character uses at the start of the game (an initially used weapon) is also set. A check counter as a variable number used in later-described check processing is set at 20 as an initial value. An appearing object at the start of the game is set, and stored as the appearing object data 128 in the external main memory 12. Subsequently, a game space is built, and displayed on the television 2. The CPU 10 builds a three-dimensional game space, and the enemy object is positioned in the virtual game space according to the appearing object data 128. A game image indicating the game space build thus is generated, and displayed on the television 2. Subsequently, the game proceeds with repetition of a processing loop of steps S2 to S9 for each frame.

Next, an input from the player through the controller 7 is accepted (step S2). More specifically, operation data transmitted from the controller 7 is obtained.

Next, based on the operation data obtained at the step S2, it is determined whether or not the content inputted from the player is a content instructing change of weapon (step S3). If the content is for instructing change of weapon (YES at the step S3), corresponding weapon data is read from the weapon master 126 based on the instruction content (step S4). If the content is not for instructing change of weapon (NO at the step S3), the processing proceeds to the next step without executing processing of the step S4.

Next, based on the operation data obtained at the step S2, a pointing position (a pointing coordinate) of the controller 7 is calculated (step S5). A method for calculating the pointing position may be any method but it is exemplified as follows.

One example of the method of calculating the pointing position will be described. The operation data obtained from the controller 7 includes data indicating marker coordinates. Since the data indicates two marker coordinates corresponding to the markers 8*a* and 8*b*, a midpoint between the two markers 8*a* and 8*b* is calculated. The position of the midpoint is represented with x-y coordinate system for representing a position on a plain corresponding to a taken image. Subsequently, the coordinate representing the position of the midpoint is converted into a coordinate of coordinate system (x'-y' coordinate system) used for representing a position in the screen of the television 2. This conversion is performed using a function which converts the coordinate of the midpoint calculated from a taken image into a coordinate in the screen which corresponds to the actual pointing position of a controller n when the taken image is taken. At this time, since the pointing position of the controller n is moved in a direction reverse to the position of the marker coordinate in the taken image, the conversion is performed such that right and left and up and down are inverted. A value indicated by an x'-y' coordinate value calculated thus is the pointing coordinate of the controller 7.

After the pointing coordinate is calculated, target setting processing is executed (step S6). In the processing, it is determined whether or not the pointing coordinate (corresponding to the aiming point) points to an enemy object, and the target setting is set for the pointed enemy object.

Figure 18:
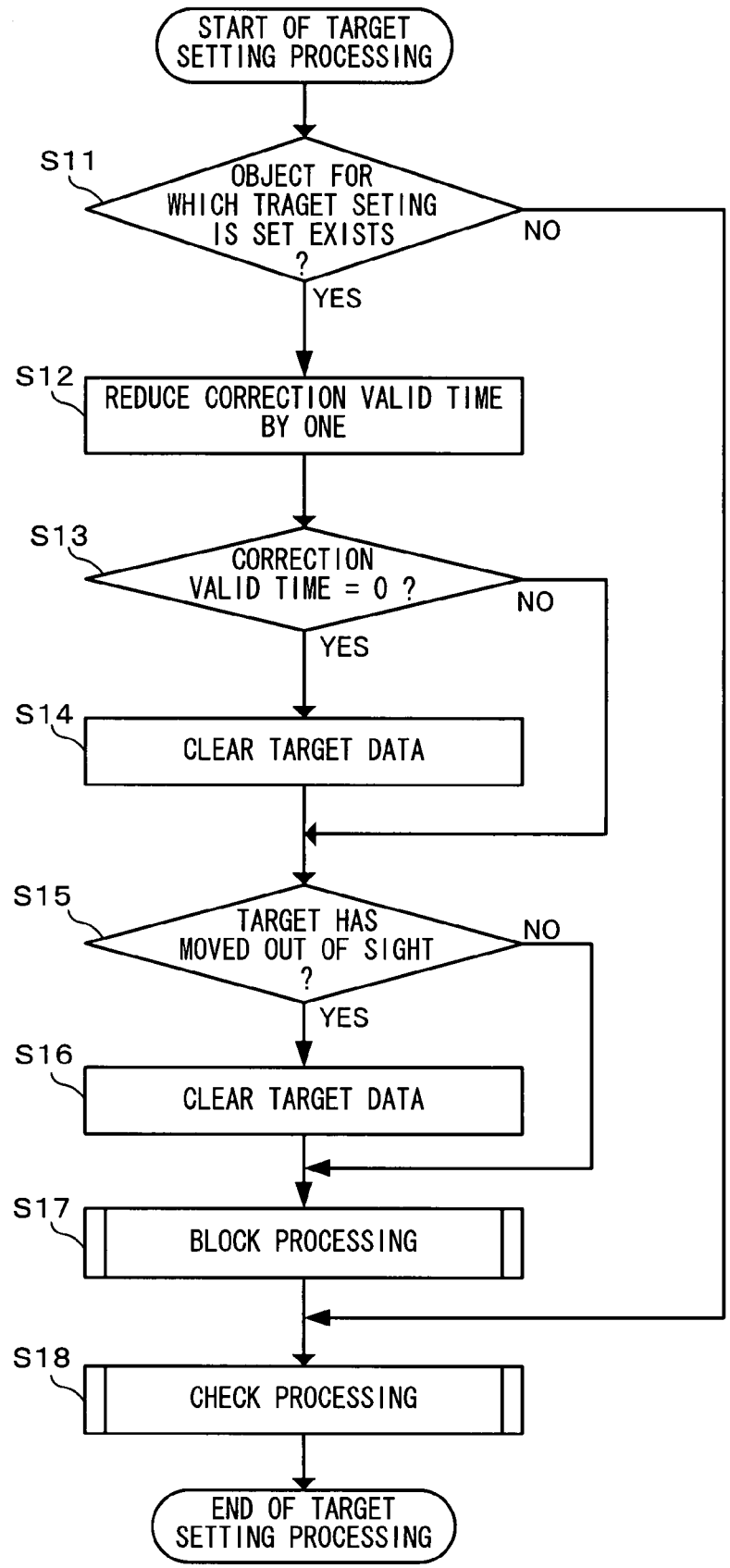
FIG. 18 is a flow chart showing in detail target setting processing shown at step S6 of FIG. 17.

FIG. 18 is a flow chart showing in detail the target setting processing shown at the step S6 of FIG. 17. As shown in FIG. 18, it is whether or not the enemy object for which the target setting has been set exists (step S11). More specifically, accessing to the target data 129, it is determined whether or not data is stored (whether or not the target data 129 is empty). When there is no enemy object for which the target setting has been set, the target data 129 is empty. Thus, when it is determined that no data is stored (NO at the step S11), it indicates that there is no enemy object for which the target setting has been set. If so, the processing proceeds to step S18, which will be described later.

On the other hand, when data is stored (YES at the step S11), it indicates that there is the enemy object for which the target setting has been set. At this time, processing is executed for canceling the target setting when a shooting operation is not performed within a correction valid time. First, a value of the correction valid time 1293 is reduced by one (step S12). Subsequently, it is determined whether or not the value of the correction valid time 1293 is zero (step S13). As a result, when the value of the correction valid time 1293 is zero (YES at the step S13), the target data 129 is cleared (step S14). In other words, because the correction valid time has run out, the target setting is cancelled. On the other hand, when the correction valid time 1293 is not zero (NO at the step S13), the processing proceeds to the next step S15 without executing the processing of the step S14.

Next, it is determined whether or not the enemy object for which the target setting has been set has moved out of sight (a visual cone of a virtual camera) (the step S15). As a result, when it is determined that the enemy object has moved out of sight (YES at the step S15), the target data 129 is cleared (step S16). In other words, in the embodiment, when the enemy object for which the target setting has been set has moved out of the screen, the target setting is cancelled. For example, when target setting is set for an enemy object displayed at the edge of the screen once and the enemy object moves out of the screen soon, the target setting for the enemy object is cancelled. On the other hand, when it is determined that the enemy object has not moved out of sight (NO at the step S15), the processing proceeds to the next processing without executing the processing of the step S16.

Next, block processing is executed (step S17). In the processing, it is determined whether or not a shield (an obstacle) exists between the player character (the virtual camera) and the enemy object for which the target setting has been set, and when the enemy object for which the target setting has been set has been blocked by the shield for 60 frames or more, the target setting is cancelled.

Figure 19:
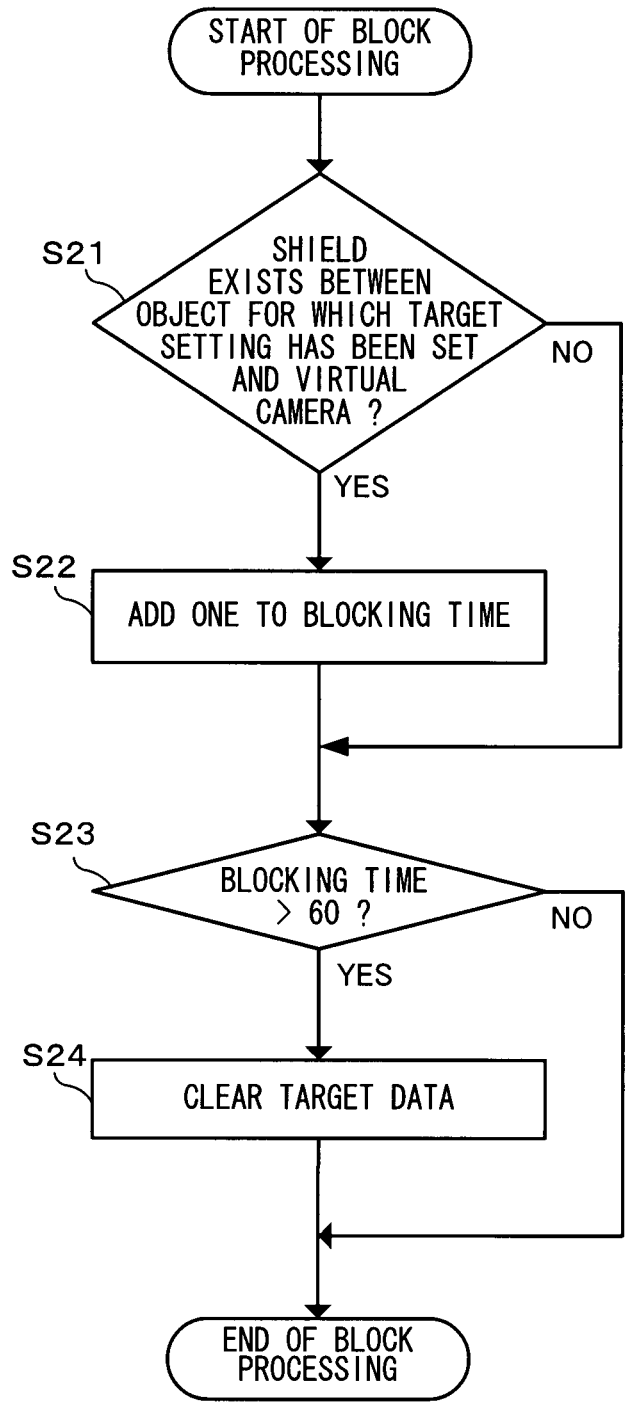
FIG. 19 is a flow chart showing in detail block processing shown at step S17 of FIG. 18.

FIG. 19 is a flow chart showing in detail the block processing shown at step S17. As shown in FIG. 19, it is determined whether or not the shield exists between the enemy object for which the target setting has been set and the virtual camera (or on a path of an arrow to be discharged) in the virtual game space (step S21). When the shield exists (YES at the step S21), one is added to the blocking time 1294 of the target data 129 (step S22).

Next, it is determined whether or not the blocking time 1294 exceeds 60 (namely, the blocking time 1294 exceeds a period of time equivalent to 60 frames) (step S23). As the result of the determination, when the blocking time 1294 exceeds 60 (YES at the step S23), the target data 129 is cleared (step S24). In other words, when the enemy object for which the target setting has been set is blocked by the shield for 60 frames, the target setting is cancelled. On the other hand, when the blocking time 1294 does not exceed 60 (NO at the step S23), the block processing is terminated without executing the processing at the step S24.

Referring back to FIG. 18, the check processing is executed (step S18) after the block processing. In the processing, a range of weapon is determined, it is determined whether or not the pointing position (or the aiming cursor 101) is aligned with an enemy object, and when the aiming point is aligned with the enemy target, corresponding data (or target setting) are stored in the target data 129.

Figure 20:
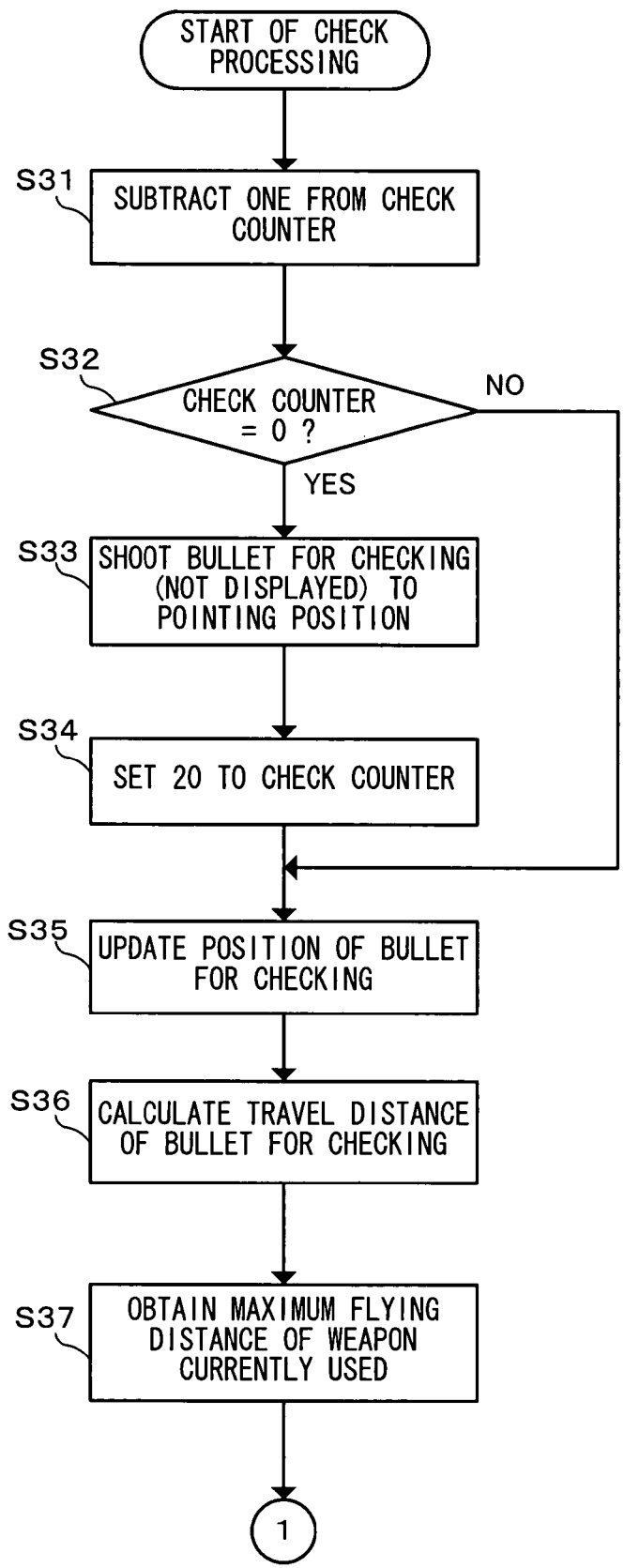
FIG. 20 is a flow chart showing in detail check processing shown at step S18 of FIG. 18.
Figure 21:
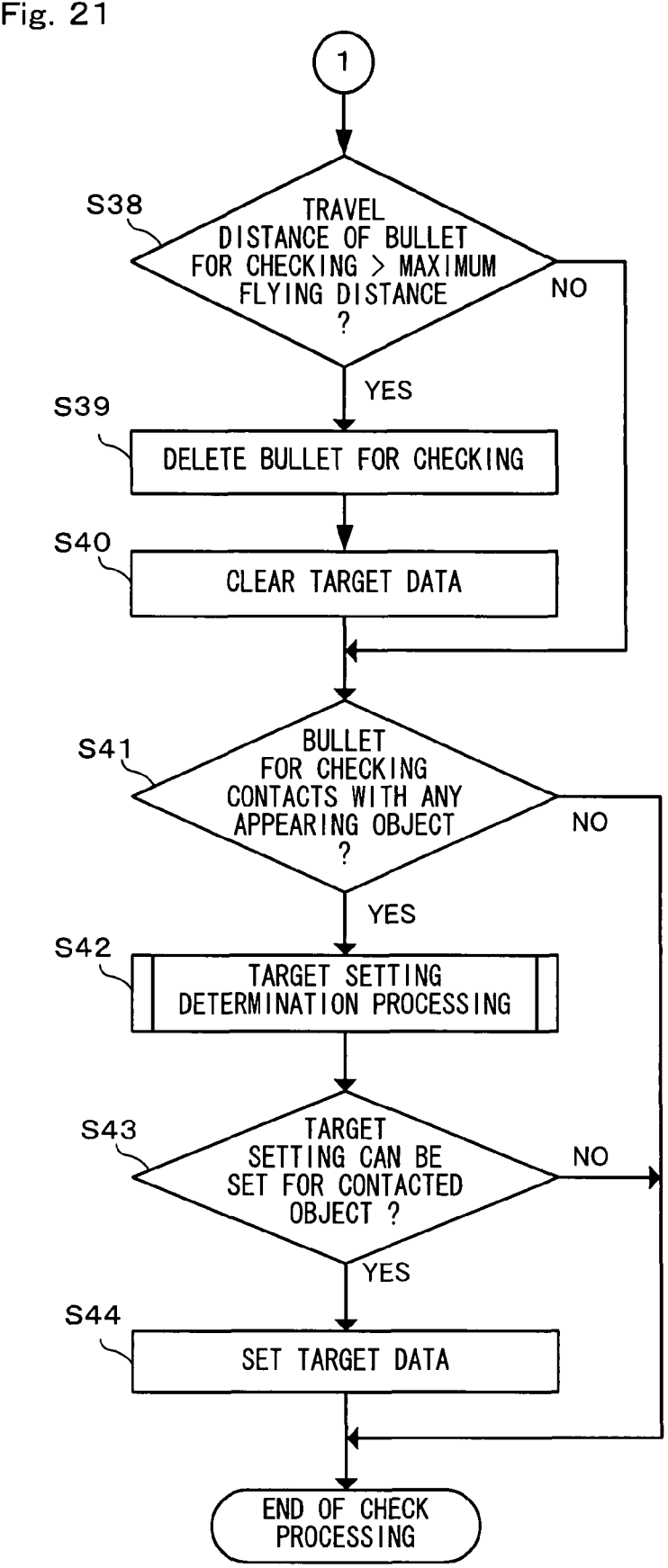
FIG. 21 is another flow chart showing in detail the check processing shown at the step S18 of FIG. 18.

FIGS. 20 and 21 are a flow chart showing in detail the check processing shown at the step S18 of FIG. 18. As shown in FIG. 20, first, processing is executed for determining whether the aiming point is aligned with the enemy object. A bullet for checking which is not to be displayed on the screen is shot in the direction to the pointing position every 20 frames. It is determined whether or not the checking bullet contacts with any enemy object in the virtual game space every frame, and when the checking bullet contacts with any enemy object, it is determined that the aiming point is aligned with the enemy object. More specifically, one is subtracted from the check counter as a variable number for counting 20 frames (step S31). Then, it is determined whether or not the check counter is zero (step S32). When the check counter is zero (YES at the step S32), the pointing position (the pointing coordinate) is coordinate-converted from two-dimensional coordinate system into three-dimensional coordinate system, and a checking bullet is shot to the converted coordinate (a coordinate in the virtual game space) (step S33). Subsequently, a value of 20 is set to the check counter (step S34). On the other hand, when the check counter is not zero (NO at the step S32), the processing proceeds to step S35 without executing the processing of the steps S33 and S34. As described thus, a checking bullet is shot every 20 frames.

Next, a range of the weapon currently used is determined. First, the position of the checking bullet shot in the virtual game space is updated (step S35).

Subsequently, a travel distance of the checking bullet after the update (a travel distance from the position where the bullet is shot to the current position, namely, a travel distance from the virtual camera as a base point) is calculated (step S36).

Next, it is determined whether or not the calculated travel distance of the checking bullet exceeds the range of the weapon currently used. More specifically, the maximum flying distance 1263 of the weapon currently used is obtained from the weapon master 126 (step S37). It is determined whether or not the calculated travel distance exceeds the maximum flying distance 1263 (step S38).

As the result of the determination, when the calculated travel distance exceeds the maximum flying distance 1263 (YES at the step S38), it indicates that the calculated travel distance exceeds the weapon currently used, and hence the checking bullet is deleted from the virtual game space (step S39). Further, when data is stored in the target data 129, the target data 129 is cleared (step S40). This assumes that the enemy object for which the target setting has been set moves out of the range of the weapon.

On the other hand, as the result of the determination at the step S38, when the calculated travel distance does not exceed the maximum flying distance 1263 (NO at the step S38), the processing proceeds to the next step S41 without executing the processing of the steps S39 and S40.

Next, processing is executed for determining contact of an arrow for checking, or whether or not the aiming cursor 101 is aligned with any enemy object. First, it is determined whether or not the checking arrow contacts with any appearing object (the step S41). When the checking arrow does not contact with any object (NO at the step S41), the check processing is terminated. On the other hand, when the checking arrow contacts with any object (YES at the step S41), target setting determination processing is executed for determining whether or not the target setting can be set for the appearing object being contacted by the checking arrow (step S42).

Figure 22:
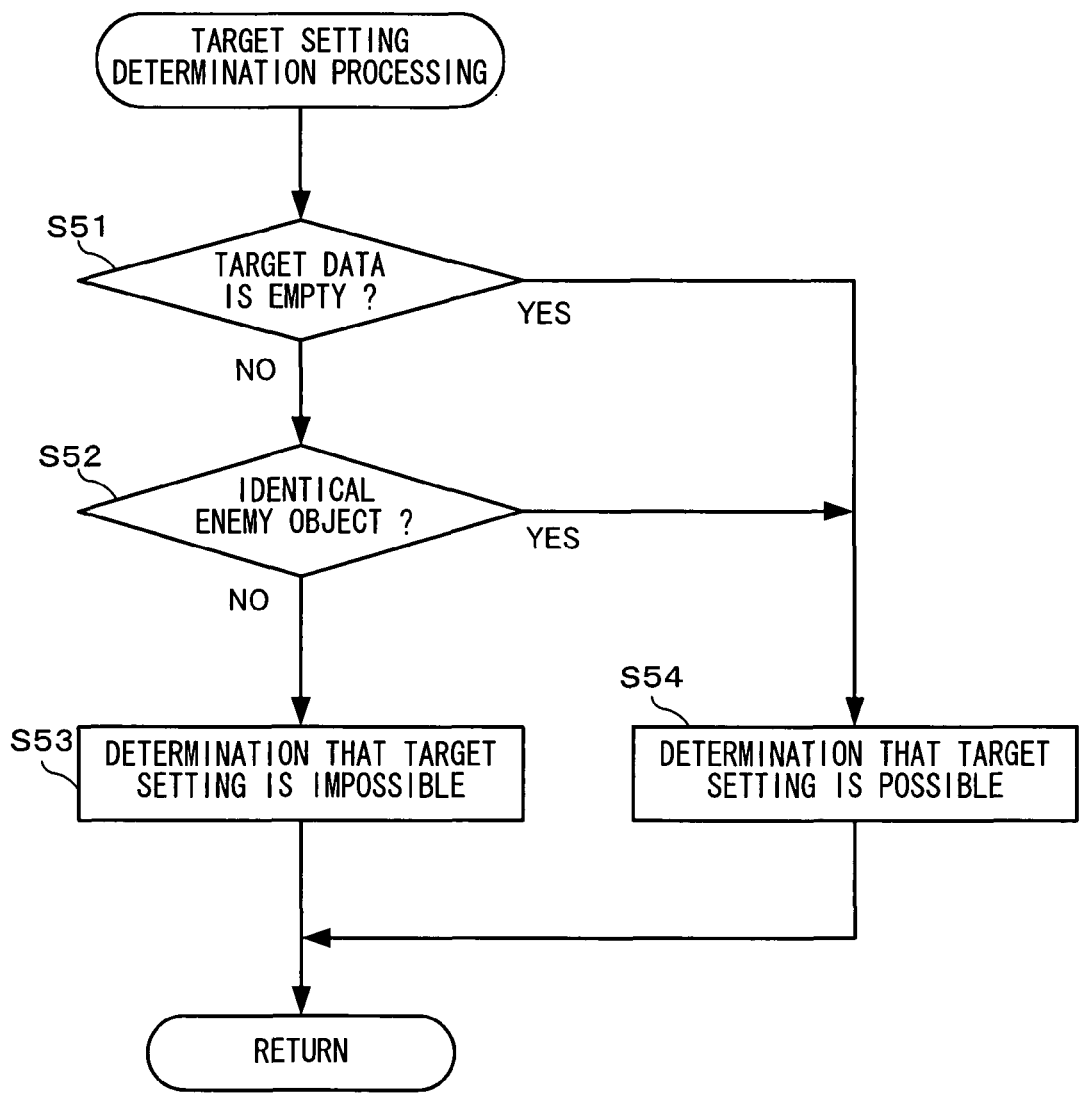
FIG. 22 is a flow chart showing in detail target setting determination processing shown at step S42 of FIG. 21.

FIG. 22 is a flow chart showing in detail the target setting determination processing shown at the step S42. As shown in FIG. 22, it is determined whether or not the target data 129 is empty, or whether or not an enemy object for which the target setting has been set exists (step S51). As the result, when an enemy object for which the target setting has been set does not exist (YES at the step S51), it is determined that the target setting is possible (step S54). On the other hand, when an enemy object for which the target setting has been set exists (NO at the step S51), it is determined whether or not the enemy object being contacted by the checking arrow at this time is identical to the enemy object for which the target setting has been set based on the object ID 1281 and the like (step S52). This assumes that the aiming cursor 101 is moved between the adjacent enemy objects. As the result, when the above enemy objects are identical to each other (YES at the step S52), it is determined that the target setting is possible (step S54). On the other hand, when the above enemy objects are not identical to each other (NO at the step S52), it is determined that the target setting is impossible (step S53). This is the end of the target setting determination processing.

Referring back to FIG. 21, after the target setting determination processing of the step S42, it is determined whether or not the target setting can be set for the object being contacted based on the result of the processing of the step S42 (step S43). As the result, when it is determined that the target setting is possible (YES at the step S43), data is set in the target data 129 (step S44). More specifically, the object ID 1281 of the enemy object being contacted and the weapon ID 1261 of the weapon currently used are copied in the target data 129. Further, an initial value, a value of 300 in the embodiment, is stored in the correction valid time 1293, and zero is stored in the blocking time 1294.

On the other hand, as the result of the determination at the step S43, when it is determined that the target setting cannot be set for the object being contacted (NO at the step S43), the check processing is terminated without executing the processing of the step S44. Returning to FIG. 18, the target setting processing is terminated with the termination of the check processing.

Figure 23:
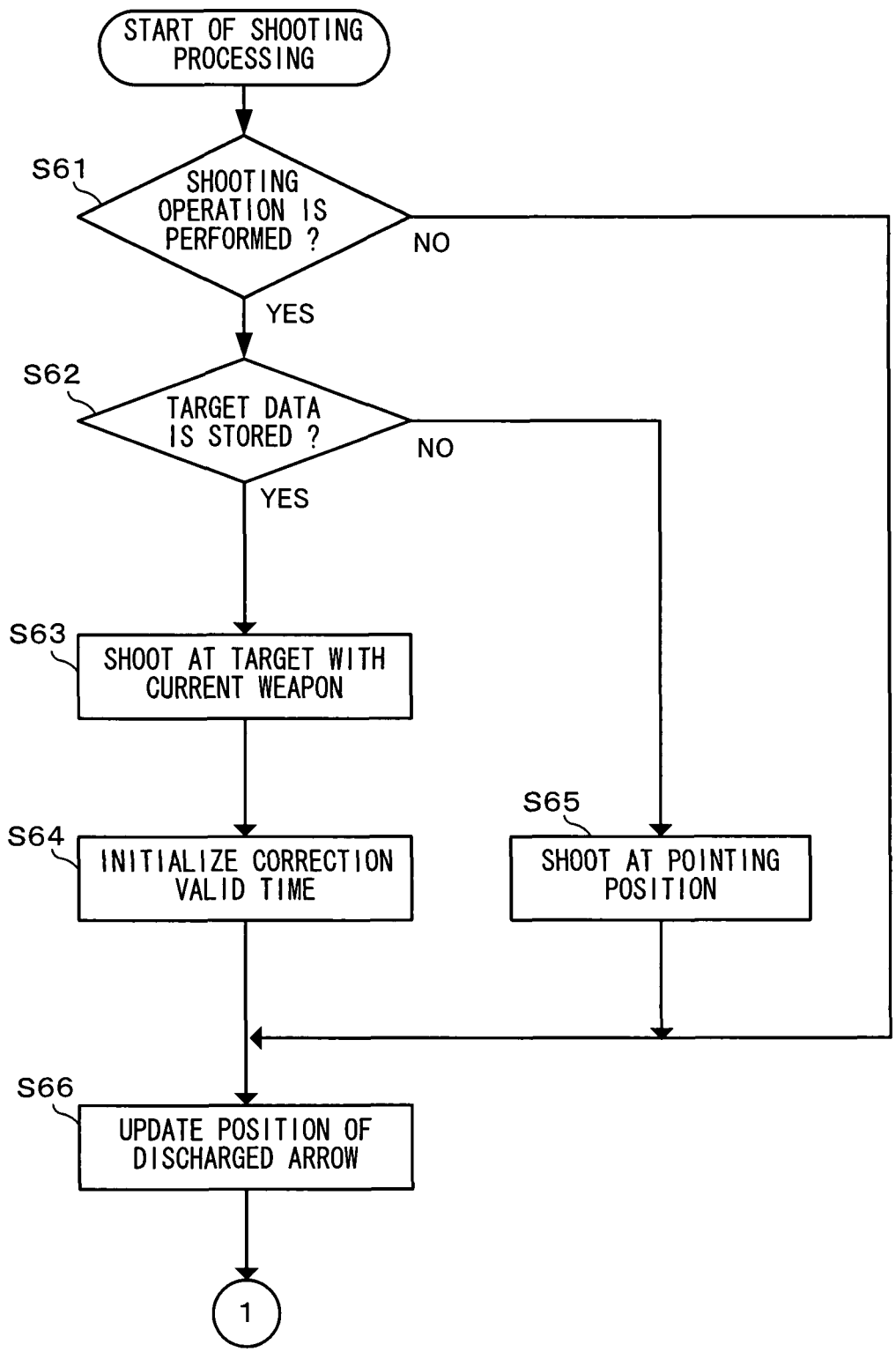
FIG. 23 is a flow chart showing in detail shooting processing shown at step S7 of FIG. 17.
Figure 24:
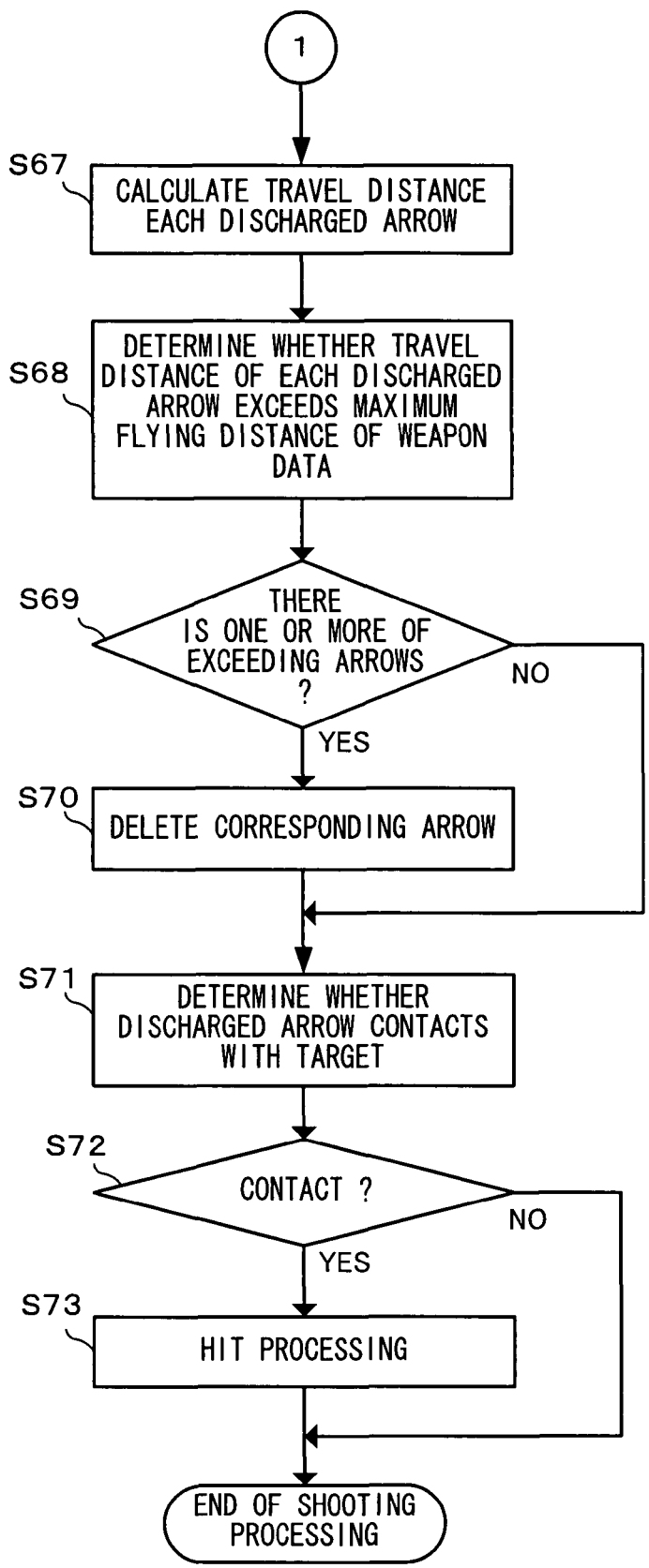
FIG. 24 is another flow chart showing in detail the shooting processing shown at the step S7 of FIG. 17.

Referring back to FIG. 17, after the target setting processing of the step S6, shooting processing is executed (step S7). FIGS. 23 and 24 area flowchart showing in detail the shooting processing shown at the step S7. As shown in FIG. 23, based on the operation data obtained at the step S2, it is determined whether or not a shooting operation (a operation for shooting a bullet of the shooting weapon currently used, such as an arrow or the like. Hereinafter, for simplifying explanation, all bullets are expressed as arrows) is performed (step S61).

Next, it is determined whether or not data is stored in the target data 129. In other words, it is determined whether or not an enemy object for which the target setting has been set exists (step S62). When it is determined that an enemy object for which the target setting has been set does not exist (NO at the step S62), an arrow is discharged toward the current pointing position (the position of the aiming point) (step S65). On the other hand, when it is determined that an enemy object for which the target setting has been set exists (YES at the step S62), an arrow is discharged toward the enemy object for which the target setting has been set (step S63). Subsequently, the correction valid time 1293 is initialized (step S64). In the embodiment, a value of 300 as the initial value as described above is stored. As described above, by initializing (or resetting) the correction valid time, continuation of shooting operations enables arrows to be continuously discharged to the enemy object for which the target setting has been set.

Next, the position of the arrow discharged in the virtual game space is updated (step S66). The discharged arrow includes the arrow discharged in the previous processing loop. In other words, the positions of all arrows remaining in the virtual game space in the current processing loop are updated.

Next, the travel distance of each discharged arrow remaining in the virtual game space is calculated (step S67). For example, in the case where three arrows are discharged in quick succession and have not reached an enemy object yet, the travel distance of each of the three arrows is calculated.

Next, it is determined whether or not the calculated travel distance of each arrow exceeds the maximum flying distance of the weapon currently used (step S68). Then, it is determined whether or not there is one or more of arrows the travel distance of which exceeds the maximum flying distance (step S69). When there is one or more of arrows the travel distance of which exceeds the maximum flying distance (YES at the step S69), such arrows are deleted from the virtual game space (step S70). When there is no arrow the travel distance of which exceeds the maximum flying distance (NO at the step S69), the processing proceeds to the next step S71 without executing the processing of the step S70.

Next, processing is executed for determining contact of each discharged arrow with the enemy object (step S71). As the result of the processing, it is determined whether or not any arrow contacts with the enemy object (step S72). When any arrow contacts with the enemy object (YES at the step S72), hit processing is executed as follows (step S73). The arrow which contacts with the enemy object is deleted from the virtual game space, and the HP of the enemy object is reduced according to the offensive power of the weapon which has discharged the arrow. Then, it is determined whether or not the HP of the enemy object becomes zero as the result of the reduction. When it is determined that the HP of the enemy object becomes zero, the target data 129 is cleared. Further, the data of the enemy object contacted is deleted from the appearing object data 128. Then, later-described drawing processing is executed for displaying a scene that the enemy object is eliminated using a plurality of frames.

On the other hand, when it is determined that any arrow does not contact with the enemy object in the determination at the step S72, the shooting process is terminated without executing the processing of the step S73.

Referring back to FIG. 17, after the step S7, the drawing processing is executed (step S8). In other words, an image in the virtual space taken by the virtual camera is displayed as a game image on the television 2. After the step S8, it is determined whether or not the game is terminated at step S9. In the case of YES, the game processing is terminated, and in the case of NO the game processing is repeated retuning to the step S2. This is the end of the explanation of the game processing executed by the game apparatus 3.

As described above, in the embodiment, once the aiming point is aligned with the enemy object, the target setting is set for the enemy object. While the player performs a shooting operation during a predetermined period of time, shooting at the enemy object is performed. Thus, a bullet is prevented from missing the enemy object due to the fact that the player unconsciously moves the aiming point out of the enemy object while repeating shooting operations for shooting the same enemy. As a result, the player does not feel the difference between the position at which the player intends to take aim and the actual position of the aiming point, and plays the game without feeling frustrated.

When an enemy object for which the target setting has been set is blocked by a shield for a predetermined period of time, the target setting is cancelled. This gives reality to the game, and enhances the fun of the game.

The embodiment described above exemplifies that a value of 300 is set as the correction valid time in the processing of the steps s44 and S64. The value may be optionally changed in accordance with the game content and the like. For example, the game may be programmed such that the player sets difficulty level of the game as one of game settings. When the difficulty level of the game is set high, the value of correction valid time may be set at 100, and when the difficulty level of the game is set low, the value of correction valid time may be set at 500. In this case, an image is displayed in which the difficulty level can be set, and the player set the difficulty level of the game. The content of the setting is stored as difficulty level data in the external main memory 12. In the initialization processing of the step S1, the difficulty level setting is obtained from the difficulty level data, and the correction valid time is set according to the content of the difficulty level setting. Thus, the player enjoys playing the game to the level of his or her skill.

Alternatively, a different value of the correction valid time may be set depending on a type of a weapon used. For example, when a crossbow is used, the value of the correction valid time may be set at 300, and when another weapon is used, it may be set at 400. In this case, an item indicating the correction valid time may be defined in the weapon master 126. The item may be read in the processing of the steps S44 and S66, and set in the target data 129. This provides used weapons with features, and the game with strategic characteristics such as selection of used weapons, with the result that the fun of the game is enhanced.

Still alternatively, a different value of the correction valid time may be set depending on a change amount in movement of the virtual camera. More specifically, when the angle of the direction of the virtual camera is significantly changed, a value of the correction valid time may be set large. For example, when the player shoots the enemy object on a ground and suddenly faces upward to shoot a bird object flying in a sky, a predetermined value may be added to the value of the correction valid time in setting the target setting for the bird object. In this case, a change amount in the direction (the angle) of the camera is detected for several frames. When this value exceeds a predetermined value, or when the direction of the camera is significantly changed (when the player suddenly faces upward), a value obtained by adding a predetermined value to an initial value of the correction valid time for the weapon may be set in the target data 129. When the player suddenly faces upward as described above, it is generally hard to take aim at an object. However, such processing makes it easy for the player to shoot an enemy object even in the case of such an operation that the direction of the virtual camera is suddenly significantly changed, with the result that the player feels less frustrated.

Still alternatively, a different value of the correction valid time may be set depending on a scene of the game. For example, the correction valid time may be set longer during nighttime in the virtual game space (it is hard to visually recognize an enemy object) than during daytime therein (it is easy to visually recognize an enemy object). The correction valid time may be set longer in forest in the virtual game space (it has a bad view, and it is hard to visually recognize an enemy object) than in plain therein (it has a good view, and it is easy to visually recognize an enemy object). In this case, a scene of the game such as daytime, nighttime, plain, forest, and the like is determined, and depending on the scene an addition or subtraction operation may be performed on the correction valid time. This enables adjustment of the difficulty level of the game, and provides each scene of the game with a feature, with the result that the player is prevented from losing an interest in the game.

Still alternatively, a different value of the correction valid time may be set depending on a size of an enemy object. Particularly, it is preferable that the correction valid time be set longer for a small-sized enemy object than for a large-sized enemy object. In this case, information on the size of an enemy object is defined in the object master 127, and the correction valid time may be set after a predetermined value is added to or subtracted from an initial value of the correction valid time according to the size. Thus, when the aiming cursor 101 is aligned with a small-sized enemy object, at which it is generally hard to take aim, for even a moment, subsequent shooting becomes easy. As the result, the player is prevented from feeling frustrated and losing an interest in the game.

When shooting operations are repeated within the correction valid time, a used weapon may be changed. In this case, on the assumption that such an operation is performed within the correction valid time, it may be determined whether or not a weapon is changed. When a weapon is changed, the weapon ID 1292 of the target data 129 may be updated to a weapon ID indicting the weapon after the change. In the case where the correction valid time is set for each weapon as described above, the correction valid time for the previously used weapon may be taken over immediately after the change of weapon, and the correction valid time for the weapon after the change may be set in the target data 129 when a shooting operation is performed at first after the change of weapon.

Concurrently, two types of shooting weapons may be used. In this case, only one aiming cursor 101 is displayed, and a weapon may be changed to another weapon through a change operation of weapon. For example, where the operation button 72i is assigned to a shooting operation and the operation button 72d to the change operation of weapon, shooting with a first shooting weapon may be performed when the operation button 72i is pressed with the operation button 72d pressed, and shooting with a second shooting weapon may be performed when only the operation button 72i is pressed. In this case, the correction valid time may be shared by both weapons. Thus, taking aim at a strong enemy object, shooting with two types of shooting weapons can be continued, with the result that the fun of the game is enhanced. Naturally, two controllers may be used, the above aiming point may be displayed for each controller, and the processing described in the above embodiment may be executed for each controller. Thus, when two strong enemy objects appear, the player can attack the two strong enemy objects concurrently, and bullets can continuously hit the two strong enemy objects without missing them, with the result that exhilaration of the game is increased and the fun of the game is enhanced.

The game apparatus is not limited to the embodiment described above but may be a game apparatus provided independently of a monitor, a personal computer functioning as a game apparatus by executing a game program, or a work station.

While the example embodiment presented herein has been described in detail, the foregoing description is in all aspects illustrative and not restrictive. It is understood that numerous other modifications and variations can be devised without departing from the scope of the present embodiment.

What is claimed is:

1. A non-transitory storage medium storing a game program executed by a computer of a game apparatus using a display device which displays on a game screen a scene of shooting at an object existing at a position in a virtual space based on an input from an input device, that is a game controller, the game program causing the computer to perform:
   accepting from the input device an input of an aiming point coordinate indicating a position of an aiming point in the game screen;
   determining whether or not the aiming point overlaps with the object based on the accepted aiming point coordinate;
   setting a target time period after the overlapping by the aiming point has caused the object to become a target of shooting such that the target time period is correlated with the object being overlapped with the aiming point;
   accepting a shooting operation with respect to the virtual space from the input device;
   performing shooting at the object and hitting the object for which the target time period is set in the virtual space irrespective of a magnitude of the difference between the position of the aiming point and the position of the object only when shooting operation is accepted within the target time period after the target time period is set for the object; and
   resetting the target time period for the object which has become the target of shooting every time the shooting operation is accepted within the target time period.

2. The non-transitory storage medium according to claim 1, wherein
   the shooting is performed based on the position of the aiming point when the shooting operation is accepted after elapse of the target time period.

3. The non-transitory storage medium according to claim 2, wherein
   the game program further causes the computer to perform:
   measuring a blocking time for which a shield exists between the object for which the target time period is set and the aiming point coordinate in the virtual space; and
   deleting of the setting of the target time period when the blocking time exceeds a predetermined time.

4. The non-transitory storage medium according to claim 2, wherein
   the setting of a target time changes the target time period according to a content of game processing executed by the game program.

5. The non-transitory storage medium according to claim 4, wherein
   the game program further causes the computer to perform:
   storing in a predetermined storage section a plurality of shooting tool data which are data concerning shooting tools used for shooting in the virtual space and in which the target time periods are set at a different value for each shooting tool; and
   selecting the shooting tool to be used in the shooting operation, and
   wherein the setting of a target time period sets the target time period with reference to the shooting tool data corresponding to the selected shooting tool.

6. The non-transitory storage medium according to claim 4, wherein
   the game program further causes the computer to perform setting of a difficulty level of a game, and
   wherein the setting of a target time period sets a different time period as the target time period for each difficulty level based on the set difficulty level of the game.

7. The non-transitory storage medium according to claim 6, wherein
   the setting of a target time period sets the target time period longer as the difficulty level of the game is set lower.

8. The non-transitory storage medium according to claim 4, wherein
   the game program further causes the computer to perform storing in a predetermined storage section size data indicating a size of the object in the virtual space, and
   wherein the setting of a target time period sets the target time period based on the size data of the object overlapped by the aiming point.

9. The non-transitory storage medium according to claim 8, wherein
   the setting of a target time period sets the target time period longer as the size of the object overlapped by the aiming point is smaller.

10. The non-transitory storage medium according to claim 4, wherein
the game program further causes the computer to perform storing in predetermined storage locations a plurality of scene data concerning scenes in which shooting is performed in the virtual space, and
wherein the setting of a target time period sets a different time period as the target time period depending on the plurality of scene data.

11. The non-transitory storage medium according to claim 4, wherein
the game program further causes the computer to perform:
measuring a blocking time for which a shield exists between the object for which the target time period is set and the aiming point coordinate in the virtual space; and
deleting the setting of the target time period when the blocking time exceeds a predetermined time.

12. The non-transitory storage medium according to claim 1, wherein
the setting of a target period time changes the target time period according to a content of game processing executed by the game program.

13. The non-transitory storage medium according to claim 12, wherein
the game program further causes the computer to perform:
storing in a predetermined storage section a plurality of shooting tool data which are data concerning shooting tools used for shooting in the virtual space and in which the target time periods are set at a different value for each shooting tool; and
selecting the shooting tool to be used in the shooting operation, and
wherein the setting of a target time period sets the target time period with reference to the shooting tool data corresponding to the shooting tool selected.

14. The non-transitory storage medium according to claim 12, wherein
the game program further causes the computer to perform setting a difficulty level of a game, and
wherein the setting a target time period sets a different time period as the target time period for each difficulty level based on the set difficulty level of the game.

15. The non-transitory storage medium according to claim 14, wherein
the setting of a target time period sets the target time period longer as the difficulty level of the game is set lower.

16. The non-transitory storage medium according to claim 12, wherein
the game program further causes the computer to perform storing in a predetermined storage section size data indicating a size of the object in the virtual space, and
wherein the setting of a target time sets the target time period based on the size data of the object overlapped by the aiming point.

17. The non-transitory storage medium according to claim 16, wherein
the setting of a target time period sets the target time period longer as the size of the object overlapped by the aiming point is smaller.

18. The non-transitory storage medium according to claim 12, wherein
the game program further causes the computer to perform storing in predetermined storage locations a plurality of scene data concerning scenes in which shooting is performed in the virtual space, and
wherein the setting of a target time period sets a different time period as the target time period depending on the scene data.

19. The non-transitory storage medium according to claim 12, wherein
the game program further causes the computer to perform:
measuring a blocking time for which a shield exists between the object for which the target time period is set and the aiming point coordinate in the virtual space; and
deleting the setting of the target time period when the blocking time exceeds a predetermined time.

20. The non-transitory storage medium according to claim 1, wherein
the game program further causes the computer to perform:
measuring a blocking time for which a shield exists between the object for which the target time period is set and the aiming point coordinate in the virtual space; and
deleting the setting of the target time period when the blocking time exceeds a predetermined time.

21. A game apparatus using a display device which displays on a game screen a scene of shooting at an object existing at a position in a virtual space based on an input from an input device, that is a game controller, the game apparatus comprising a computer processing system having one or more computer processors configured to:
accept from the input device an input of an aiming point coordinate indicating a position of an aiming point in the game screen;
determine whether or not the aiming point overlaps with the object based on the accepted aiming point coordinate;
set a target time period after the overlapping by the aiming point has caused the object to become a target of shooting such that the target time period is correlated with the object being overlapped with the aiming point;
accept a shooting operation with respect to the virtual space from the input device;
perform shooting at the object and hitting the object for which the target time period is set in the virtual space irrespective of a magnitude of the difference between the position of the aiming point and the position of the object only when the shooting operation is accepted within the target time period after the target time period is set for the object; and
reset the target time period for the object which has become the target of shooting every time the shooting operation is accepted within the target time period.

22. A method using a display device for displaying on a game screen a scene of shooting at an object existing at a position in a virtual space based on an input from an input device, which is a game controller, the method executed by a computer executing a game program comprising:
accepting from the input device an input of an aiming point coordinate indicating a position of an aiming point in the game screen;
determining whether or not the aiming point overlaps with the object based on the accepted aiming point coordinate;
setting a target time period after the overlapping by the aiming point has caused the object to become a target of shooting such that the target time period is correlated with the object being overlapped with the aiming point;
accepting a shooting operation with respect to the virtual space from the input device;
performing, using a computer system having at least one computer processor, shooting at the object and hitting the object for which the target time period is set in the virtual space irrespective of a magnitude of the difference between the position of the aiming point and the position of the object only when the shooting operation is accepted within the target time period after the target time period is set for the object; and resetting the target time period for the object which has become the target of shooting every time the shooting operation is accepted within the target time period.

23. A system comprising:

a communications device configured to receive an input from an input device that is a game controller, provided relative to a display portion of a display device which displays on a game screen a scene of shooting at an object existing at a position in a virtual space; and a computer processing system having one or more computer processors configured to:

generate the display portion for displaying at least an operating portion of a game space;

perform accepting from the input device an input of an aiming point coordinate indicating a position of an aiming point in the game screen;

perform determining whether or not the aiming point overlaps with the object based on the accepted aiming point coordinate;

perform setting a target time period after the overlapping by the aiming point has caused the object to become a target of shooting such that the target time period is correlated with the object being overlapped with the aiming point;

perform accepting a shooting operation with respect to the virtual space from the input device;

perform shooting at the object and hitting the object for which the target time period is set in the virtual space irrespective of a magnitude of the difference between the position of the aiming point and the position of the object only when the shooting operation is accepted within the target time period after the target time period is set for the object; and perform resetting of the target time period for the object which has become the target of shooting every time the shooting operation is accepted within the target time period.

\* \* \* \* \*